US012342263B2

United States Patent
Gholmieh et al.

(10) Patent No.: US 12,342,263 B2
(45) Date of Patent: Jun. 24, 2025

(54) TECHNIQUES FOR SYSTEM INFORMATION BROADCAST IN A SERVICE-BASED WIRELESS SYSTEM

(71) Applicant: QUALCOMM Incorporated, San Diego, CA (US)

(72) Inventors: Aziz Gholmieh, Del Mar, CA (US); Miguel Griot, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/948,107

(22) Filed: Sep. 19, 2022

(65) Prior Publication Data

US 2024/0098627 A1 Mar. 21, 2024

(51) Int. Cl.
*H04W 48/14* (2009.01)
(52) U.S. Cl.
CPC .................... *H04W 48/14* (2013.01)
(58) Field of Classification Search
CPC ...................................................... H04W 48/14
See application file for complete search history.

(56) References Cited

U.S. PATENT DOCUMENTS

| | | | |
|---|---|---|---|
| 11,553,504 B2 * | 1/2023 | Balasubramanian | ........................ H04W 72/23 |
| 11,751,170 B2 * | 9/2023 | Marupaduga | ..... H04W 72/0453 370/329 |
| 11,785,632 B2 * | 10/2023 | Kim | ...................... H04L 5/0091 370/329 |
| 11,856,506 B2 * | 12/2023 | Takahashi | ............. H04W 48/14 |
| 11,930,484 B2 * | 3/2024 | Vaidya | .................. H04W 72/23 |
| 2022/0124511 A1 * | 4/2022 | Kim | ...................... H04W 76/28 |
| 2022/0322130 A1 * | 10/2022 | Muruganathan | ........ H04L 5/005 |
| 2022/0338080 A1 * | 10/2022 | Youtz | .................... H04W 76/27 |
| 2022/0408498 A1 * | 12/2022 | Cheng | .................. H04W 76/20 |
| 2023/0262471 A1 * | 8/2023 | Lee | ....................... H04W 24/08 370/252 |
| 2024/0032021 A1 * | 1/2024 | Ninacs | ............. H04W 72/1263 |

(Continued)

FOREIGN PATENT DOCUMENTS

| | | | | |
|---|---|---|---|---|
| CN | 112544094 B | * | 7/2024 | ........ H04W 36/0022 |
| EP | 3476157 B1 | | 8/2022 | |

(Continued)

OTHER PUBLICATIONS

International Search Report and Written Opinion—PCT/US2023/032337—ISA/EPO—Dec. 11, 2023 (2205792WO).

(Continued)

*Primary Examiner* — Adam D Houston
(74) *Attorney, Agent, or Firm* — Holland & Hart LLP

(57) ABSTRACT

Methods, systems, and devices for wireless communications are described. In the context of a service-based wireless system, a network entity of a random access network (RAN) may aggregate system information block (SIB) configurations from multiple core network services, where the core network services are offered or provided by a service-based network that interfaces with the RAN. After aggregating the SIB configurations, the network entity may relay or broadcast system information (e.g., SIB containers) to UEs communicatively coupled to the RAN on behalf of the core network services.

30 Claims, 17 Drawing Sheets

(56) References Cited

U.S. PATENT DOCUMENTS

| | | | | |
|---|---|---|---|---|
| 2024/0155472 A1* | 5/2024 | Abedini | ............... | H04W 48/20 |
| 2024/0267939 A1* | 8/2024 | Wei | ..................... | H04W 64/006 |
| 2024/0276296 A1* | 8/2024 | Liu | .................. | H04W 72/0453 |
| 2024/0297767 A1* | 9/2024 | Sangal | ................. | H04L 1/1812 |
| 2024/0323951 A1* | 9/2024 | Behura | ................ | H04L 5/0051 |
| 2025/0063477 A1* | 2/2025 | Jung | .................... | H04W 48/10 |

FOREIGN PATENT DOCUMENTS

| | | | |
|---|---|---|---|
| JP | 2024517245 A | * | 4/2024 |
| WO | WO-2022021232 A1 | | 2/2022 |
| WO | WO-2022022947 A1 | | 2/2022 |

OTHER PUBLICATIONS

Zte, et al., "F1 Impact to Support NR V2X", 3GPP TSG RAN WG3 Meeting #105 bis, R3-195700, 3rd Generation Partnership Project, Mobile Competence Centre, 650, Route Des Lucioles, F-06921 Sophia-Antipolis Cedex, France, vol. RAN WG3, No. Chongqing, China, Oct. 14, 2019-Oct. 18, 2019, Oct. 4, 2019, XP051792723, 6 Pages, The Whole Document.

\* cited by examiner

TECHNIQUES FOR SYSTEM INFORMATION BROADCAST IN A SERVICE-BASED WIRELESS SYSTEM

FIELD OF TECHNOLOGY

The following relates to wireless communications, including techniques for system information broadcast in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a radio access network (RAN) that supports wireless communication for communication devices, which may be known as user equipment (UE).

In the context of a service-based wireless system, different core network services may be expected to share information (e.g., system information, such as system information block (SIB) messages/containers) with UEs and other wireless devices in the network so that the respective devices are able to communicate with the core network services.

SUMMARY

The described techniques relate to improved methods, systems, devices, and apparatuses that support techniques for system information broadcast in a service-based wireless system. Generally, aspects of the present disclosure are directed to signaling, configurations, and other mechanisms for distributing system information (e.g., system information block (SIB) messages) in a service-based wireless system. In particular, aspects of the present disclosure are directed to signaling that enables network entities (e.g., distributed units (DUs)) to compile SIB configurations for multiple different core network services, and distribute the SIBs for the respective core network services according to the acquired SIB configurations.

A method is described. The method may include receiving, from a first core network service offered by a service-based network, first signaling indicating a first SIB configuration associated with the first core network service, the first SIB configuration including first information associated with communications with the first core network service, receiving, from a second core network service offered by the service-based network, second signaling indicating a second SIB configuration associated with the second core network service, the second SIB configuration including second information associated with communications with the second core network service, transmitting, to one or more UEs, a first SIB container including the first information, and transmitting, to the one or more UEs, a second SIB container including the second information.

An apparatus is described. The apparatus may include a processor, memory coupled with the processor, and instructions stored in the memory. The instructions may be executable by the processor to cause the apparatus to receive, from a first core network service offered by a service-based network, first signaling indicating a first SIB configuration associated with the first core network service, the first SIB configuration including first information associated with communications with the first core network service, receive, from a second core network service offered by the service-based network, second signaling indicating a second SIB configuration associated with the second core network service, the second SIB configuration including second information associated with communications with the second core network service, transmit, to one or more UEs, a first SIB container including the first information, and transmit, to the one or more UEs, a second SIB container including the second information.

Another apparatus is described. The apparatus may include means for receiving, from a first core network service offered by a service-based network, first signaling indicating a first SIB configuration associated with the first core network service, the first SIB configuration including first information associated with communications with the first core network service, means for receiving, from a second core network service offered by the service-based network, second signaling indicating a second SIB configuration associated with the second core network service, the second SIB configuration including second information associated with communications with the second core network service, means for transmitting, to one or more UEs, a first SIB container including the first information, and means for transmitting, to the one or more UEs, a second SIB container including the second information.

A non-transitory computer-readable medium storing code is described. The code may include instructions executable by a processor to receive, from a first core network service offered by a service-based network, first signaling indicating a first SIB configuration associated with the first core network service, the first SIB configuration including first information associated with communications with the first core network service, receive, from a second core network service offered by the service-based network, second signaling indicating a second SIB configuration associated with the second core network service, the second SIB configuration including second information associated with communications with the second core network service, transmit, to one or more UEs, a first SIB container including the first information, and transmit, to the one or more UEs, a second SIB container including the second information.

In some examples of the method, apparatuses, and non-transitory computer-readable medium described herein, the first signaling, the second signaling, or both, may be received in accordance with application programming interface (API) information associated with the DU.

Some examples of the method, apparatuses, and non-transitory computer-readable medium described herein may further include operations, features, means, or instructions for receiving, via the first signaling, a first set of parameters associated with the first SIB configuration, where the first set of parameters includes scheduling information of the first SIB container, a size of the first SIB container, a quality of service (QoS) metric for the first SIB container, a delivery delay for the first SIB container, a coverage area for the first SIB container, or any combination thereof, where the first SIB container may be transmitted in accordance with the first set of parameters.

Some examples of the method, apparatuses, and non-transitory computer-readable medium described herein may further include operations, features, means, or instructions for receiving, via the first signaling, an indication that SIB containers associated with the first SIB configuration may be to be provided on-demand in response to requests from the one or more UEs, where transmitting the first SIB container may be based on the indication.

Some examples of the method, apparatuses, and non-transitory computer-readable medium described herein may further include operations, features, means, or instructions for transmitting, to the one or more UEs, the indication that SIB containers associated with the first SIB configuration may be to be provided on-demand in response to requests from the one or more UEs and receiving, from a UE of the one or more UEs, a request for the first SIB container based on transmitting the indication, where the first SIB container may be transmitted to the UE in response to the request.

Some examples of the method, apparatuses, and non-transitory computer-readable medium described herein may further include operations, features, means, or instructions for transmitting, to the one or more UEs, a third SIB container including third information associated with communications between the DU and the one or more UEs.

Some examples of the method, apparatuses, and non-transitory computer-readable medium described herein may further include operations, features, means, or instructions for transmitting, the first core network service, the second core network service, an additional core network service, or any combination thereof, third signaling indicating API information associated with the DU, where the first signaling, the second signaling, or both, may be received in accordance with the application programming interrace information.

Some examples of the method, apparatuses, and non-transitory computer-readable medium described herein may further include operations, features, means, or instructions for transmitting, to the one or more UEs, third signaling indicating first scheduling information associated with the first SIB container and second scheduling information associated with the second SIB container, where the first SIB container and the second SIB container may be transmitted in accordance with the first scheduling information and the second scheduling information, respectively.

In some examples of the method, apparatuses, and non-transitory computer-readable medium described herein, and the method, apparatuses, and non-transitory computer-readable medium may include further operations, features, means, or instructions for transmitting, to the one or more UEs, a third SIB container including the third information.

Some examples of the method, apparatuses, and non-transitory computer-readable medium described herein may further include operations, features, means, or instructions for receiving the first SIB container via the first signaling, where transmitting the first SIB container includes relaying the first SIB container without decoding the first SIB container.

Some examples of the method, apparatuses, and non-transitory computer-readable medium described herein may further include operations, features, means, or instructions for communicating a first service message between the one or more UEs and the first core network service based on transmitting the first SIB container and communicating a second service message between the one or more UEs and the second core network service based on transmitting the second SIB container.

A method is described. The method may include receiving, via a DU, a first SIB container including first information associated with communications with a first core network service offered by a service-based network, receiving, via the DU, a second SIB container including second information associated with communications with a second core network service offered by the service-based network, communicating, via the DU, a first service message with the first core network service based on the first SIB container, and communicating, via the DU, a second service message with the second core network service based on the second SIB container.

An apparatus is described. The apparatus may include a processor, memory coupled with the processor, and instructions stored in the memory. The instructions may be executable by the processor to cause the apparatus to receive, via a DU, a first SIB container including first information associated with communications with a first core network service offered by a service-based network, receive, via the DU, a second SIB container including second information associated with communications with a second core network service offered by the service-based network, communicate, via the DU, a first service message with the first core network service based on the first SIB container, and communicate, via the DU, a second service message with the second core network service based on the second SIB container.

Another apparatus is described. The apparatus may include means for receiving, via a DU, a first SIB container including first information associated with communications with a first core network service offered by a service-based network, means for receiving, via the DU, a second SIB container including second information associated with communications with a second core network service offered by the service-based network, means for communicating, via the DU, a first service message with the first core network service based on the first SIB container, and means for communicating, via the DU, a second service message with the second core network service based on the second SIB container.

A non-transitory computer-readable medium storing code is described. The code may include instructions executable by a processor to receive, via a DU, a first SIB container including first information associated with communications with a first core network service offered by a service-based network, receive, via the DU, a second SIB container including second information associated with communications with a second core network service offered by the service-based network, communicate, via the DU, a first service message with the first core network service based on the first SIB container, and communicate, via the DU, a second service message with the second core network service based on the second SIB container.

In some examples of the method, apparatuses, and non-transitory computer-readable medium described herein, the first signaling, the second signaling, or both, may be received in accordance with API information associated with the DU.

Some examples of the method, apparatuses, and non-transitory computer-readable medium described herein may further include operations, features, means, or instructions for receiving, from the DU, an indication that SIB containers associated with the first core network service may be to be provided on-demand in response to requests from the UE and transmitting, to the DU, a request for the first SIB container based on receiving the indication, where the first SIB container may be received in response to the request.

Some examples of the method, apparatuses, and non-transitory computer-readable medium described herein may further include operations, features, means, or instructions for receiving, via the DU, a third SIB container including third information associated with communications with the first core network service, where communicating the first service message may be based on receiving the third SIB container.

Some examples of the method, apparatuses, and non-transitory computer-readable medium described herein may further include operations, features, means, or instructions for receiving, from the DU, a third SIB container including third information associated with communications between the DU and the UE, where communicating the first service message, the second service message, or both, may be based on the third SIB container.

Some examples of the method, apparatuses, and non-transitory computer-readable medium described herein may further include operations, features, means, or instructions for receiving, from the DU, third signaling indicating first scheduling information associated with the first SIB container and second scheduling information associated with the second SIB container and monitoring for the first SIB container and the second SIB container in accordance with the first scheduling information and the second scheduling information, respectively, where receiving the first SIB container and the second SIB container may be based on the monitoring.

A method is described. The method may include transmitting, to a DU, first signaling indicating a SIB configuration associated with the core network service, the SIB configuration including first information associated with communications with the core network service, transmitting, to the DU based on the SIB configuration, an instruction for the DU to communicate the first information to one or more UEs via a first SIB container, and communicating a service message with a UE of the one or more UEs based on the instruction.

An apparatus is described. The apparatus may include a processor, memory coupled with the processor, and instructions stored in the memory. The instructions may be executable by the processor to cause the apparatus to transmit, to a DU, first signaling indicating a SIB configuration associated with the core network service, the SIB configuration including first information associated with communications with the core network service, transmit, to the DU based on the SIB configuration, an instruction for the DU to communicate the first information to one or more UEs via a first SIB container, and communicate a service message with a UE of the one or more UEs based on the instruction.

Another apparatus is described. The apparatus may include means for transmitting, to a DU, first signaling indicating a SIB configuration associated with the core network service, the SIB configuration including first information associated with communications with the core network service, means for transmitting, to the DU based on the SIB configuration, an instruction for the DU to communicate the first information to one or more UEs via a first SIB container, and means for communicating a service message with a UE of the one or more UEs based on the instruction.

A non-transitory computer-readable medium storing code is described. The code may include instructions executable by a processor to transmit, to a DU, first signaling indicating a SIB configuration associated with the core network service, the SIB configuration including first information associated with communications with the core network service, transmit, to the DU based on the SIB configuration, an instruction for the DU to communicate the first information to one or more UEs via a first SIB container, and communicate a service message with a UE of the one or more UEs based on the instruction.

In some examples of the method, apparatuses, and non-transitory computer-readable medium described herein, the first signaling, the second signaling, or both, is transmitted in accordance with API information associated with the DU.

Some examples of the method, apparatuses, and non-transitory computer-readable medium described herein may further include operations, features, means, or instructions for transmitting, via the first signaling, a set of parameters associated with the SIB configuration, where the set of parameters includes scheduling information of the first information block container, a size of the first SIB container, a QoS metric for the first SIB container, a delivery delay for the first SIB container, a coverage area for the first SIB container, or any combination thereof.

Some examples of the method, apparatuses, and non-transitory computer-readable medium described herein may further include operations, features, means, or instructions for transmitting, via the first signaling, an indication that SIB containers associated with the SIB configuration may be to be communicated on-demand in response to requests from the one or more UEs, where communicating the service message may be based on the indication.

Some examples of the method, apparatuses, and non-transitory computer-readable medium described herein may further include operations, features, means, or instructions for receiving API information associated with the DU, where transmitting the first signaling to the DU, transmitting the instruction to the DU, or both, may be based on the API information.

Some examples of the method, apparatuses, and non-transitory computer-readable medium described herein may further include operations, features, means, or instructions for receiving, from the DU, a second core network service, or both, second signaling indicating API information associated with the DU, where the first signaling may be transmitted in accordance with the application programming interrace information.

In some examples of the method, apparatuses, and non-transitory computer-readable medium described herein, the SIB configuration further includes second information associated with communications with the core network service and the method, apparatuses, and non-transitory computer-readable medium may include further operations, features, means, or instructions for transmitting, to the DU, an instruction for the DU to communicate the second information to the one or more UEs via a second SIB container.

DETAILED DESCRIPTION

Figure 1:
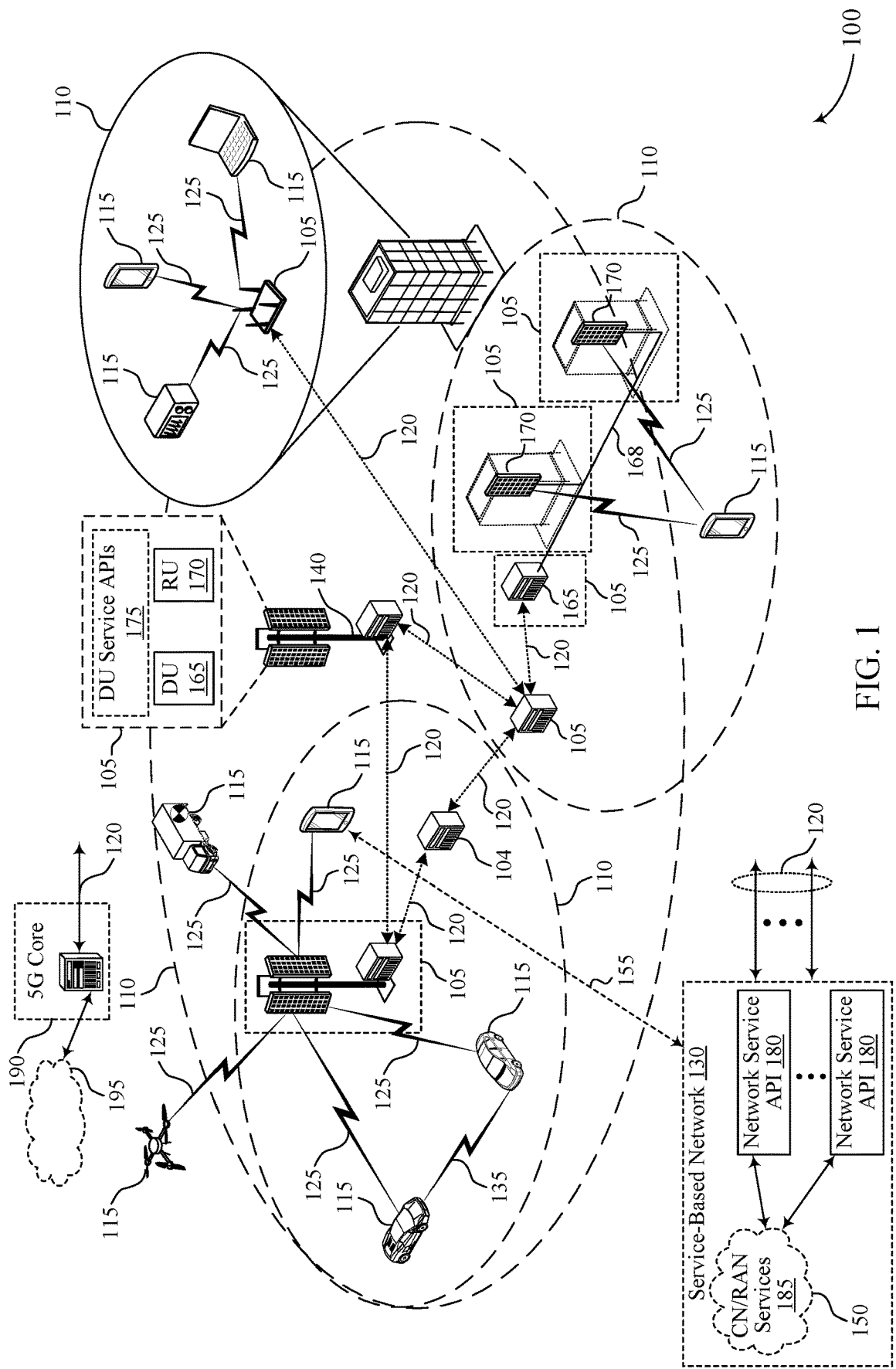
FIG. 1 illustrates an example of a wireless communications system that supports techniques for system information broadcast in a service-based wireless system in accordance with one or more aspects of the present disclosure.

Some wireless systems may exhibit a relatively vertical, hierarchal architecture that includes many "layers" of different devices that perform functions for the system. For example, a wireless system may include user equipments (UEs), base stations/network entities, and numerous back-end (e.g., core network) devices associated with one or more functions for the system. Such a hierarchal structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an a la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

In the context of a service-based wireless system, such a service-based 6G network, different core network services may be expected to share information (e.g., system information, such as system information block (SIB) messages/containers) with UEs and other wireless devices in the network so that the respective devices are able to communicate with the core network services. In some conventional systems (e.g., 5G networks), network entities may receive system information from the core network, decode the system information, and package the system information into SIBs that are broadcast to UEs. However, requiring network entities to decode and package SIBs for large quantities of core network services may result in increased complexity and processing power at the network entities. Moreover, as compared to some conventional systems which exhibit a centralized back-end network that compiles and packages system information that is to be distributed throughout the network, a service-based system may include many different core network services that are associated with different operators, protocols, and communications parameters. As such, each respective core network service may have its own system information to broadcast, further complicating the communication of system information within a service-based architecture.

Accordingly, aspects of the present disclosure are directed to signaling, configurations, and other mechanisms for distributing system information (e.g., SIBs) in a service-based wireless system. In particular, aspects of the present disclosure are directed to signaling that enables network entities (e.g., distributed units (DUs)) to compile SIB configurations for multiple different core network services, and distribute the SIBs for the respective core network services according to the acquired SIB configurations.

For example, a service-based network may include a first core network service and a second core network service. In this example, a network entity may receive a first SIB configuration from the first core network service and a second SIB configuration from the second core network service. The SIB configurations may indicate SIB containers (e.g., SIB messages) that are to be relayed to UEs by the network entity. In some cases, the respective SIB configurations may indicate various parameters for transmitting/broadcasting the SIB containers, including scheduling information for the SIB containers, a size of the SIB containers, coverage areas for the respective SIB containers, whether the SIB containers are to be provided on-demand (e.g., in response to requests from UEs), etc. The network entity may then transmit/broadcast different SIB containers for the core network services according to the respective SIB configurations.

In some implementations, the network entity may be configured to broadcast/relay the SIB containers received from the core network services without decoding the SIB containers. In other words, the SIB containers included within the SIB configurations may be transparent to the network entity. Comparatively, other portions of the SIB configuration (e.g., parameters for communicating SIB containers, such as the scheduling information) may be decoded by the network entity so that the network entity can distribute the SIB containers in accordance with the respective parameters. In some aspects, the network entity may indicate application programming interface (API) information to the respective core network services, where the API information enables the core network services to generate and format signaling in such a manner that enables the network entity to receive the SIB configurations, decode the parameters for SIB communication, and relay/broadcast the SIB containers according to the parameters.

Aspects of the disclosure are initially described in the context of wireless communications systems. Additional aspects of the disclosure are described in the context of an example network architecture and an example process flow. Aspects of the disclosure are further illustrated by and described with reference to apparatus diagrams, system diagrams, and flowcharts that relate to techniques for system information broadcast in a service-based wireless system.

FIG. 1 illustrates an example of a wireless communications system 100 that supports techniques for capability indication to multiple services in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). Similarly, the one or more UEs 115 may communicate with the service-based network 130 via a communication link 155. In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a distributed unit 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more APIs. For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (MC) (e.g., a Near-Real Time MC (Near-RT MC), a Non-Real Time MC (Non-RT MC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g. 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge, and allowing for adaptation at the DU 165 for more efficient activation, deactivation, or selection of features based on UE conditions.

In some implementations, the wireless communications system 100 support signaling, configurations, and other mechanisms for distributing system information (e.g., SIBs) in a service-based wireless system. In particular, the wireless communications system 100 may support signaling that enables network entities 105 (e.g., DUs) to compile SIB configurations for multiple different core network services (e.g., CN/RAN services 185) of the service-based network 130, and distribute the SIBs for the respective core network services according to the acquired SIB configurations.

For example, the service-based network 130 may include a first core network service (e.g., first CN/RAN service 185) and a second core network service (e.g., second CN/RAN service 185). In this example, a network entity 105 may receive a first SIB configuration from the first core network service and a second SIB configuration from the second core network service. The SIB configurations may indicate SIB containers (e.g., SIB messages) that are to be relayed to UEs 115 by the network entity 105. In some cases, the respective SIB configurations may indicate various parameters for transmitting/broadcasting the SIB containers, including scheduling information for the SIB containers, a size of the SIB containers, coverage areas for the respective SIB containers, whether the SIB containers are to be provided on-demand (e.g., in response to requests from UEs 115), etc. The network entity 105 may then transmit/broadcast different SIB containers for the core network services according to the respective SIB configurations.

In some implementations, the network entity 105 may be configured to broadcast/relay the SIB containers received from the core network services without decoding the SIB containers. In other words, the SIB containers included within the SIB configurations may be transparent to the network entity 105. Comparatively, other portions of the SIB configuration (e.g., parameters for communicating SIB containers, such as the scheduling information) may be decoded by the network entity 105 so that the network entity can distribute the SIB containers in accordance with the respective parameters. In some aspects, the network entity 105 may indicate API information to the respective core network services, where the API information enables the core network services to generate and format signaling in such a manner that enables the network entity 105 to receive the SIB configurations, decode the parameters for SIB communication, and relay/broadcast the SIB containers according to the parameters.

Techniques described herein may enable network entities 105 to broadcast system information to UEs 115 on behalf of core network services of the service-based network 130. Moreover, techniques described herein may enable network entities 105 to receive SIB containers from core network services, and relay the SIB containers to UEs 115 without decoding the respective SIB containers (e.g., transparent SIB containers). In this regard, aspects of the present disclosure may enable network entities 105 to efficiently aggregate system information from a multitude of core network services, and relay the system information to other wireless devices, thereby enabling the efficient communication of system information and facilitating more efficient and reliable wireless communications. Moreover, by enabling network entities 105 to relay SIB containers without decoding the SIB containers, techniques described herein may reduce processing requirements at the network entities 105, thereby reducing complexity and power consumption of the network.

Figure 2:
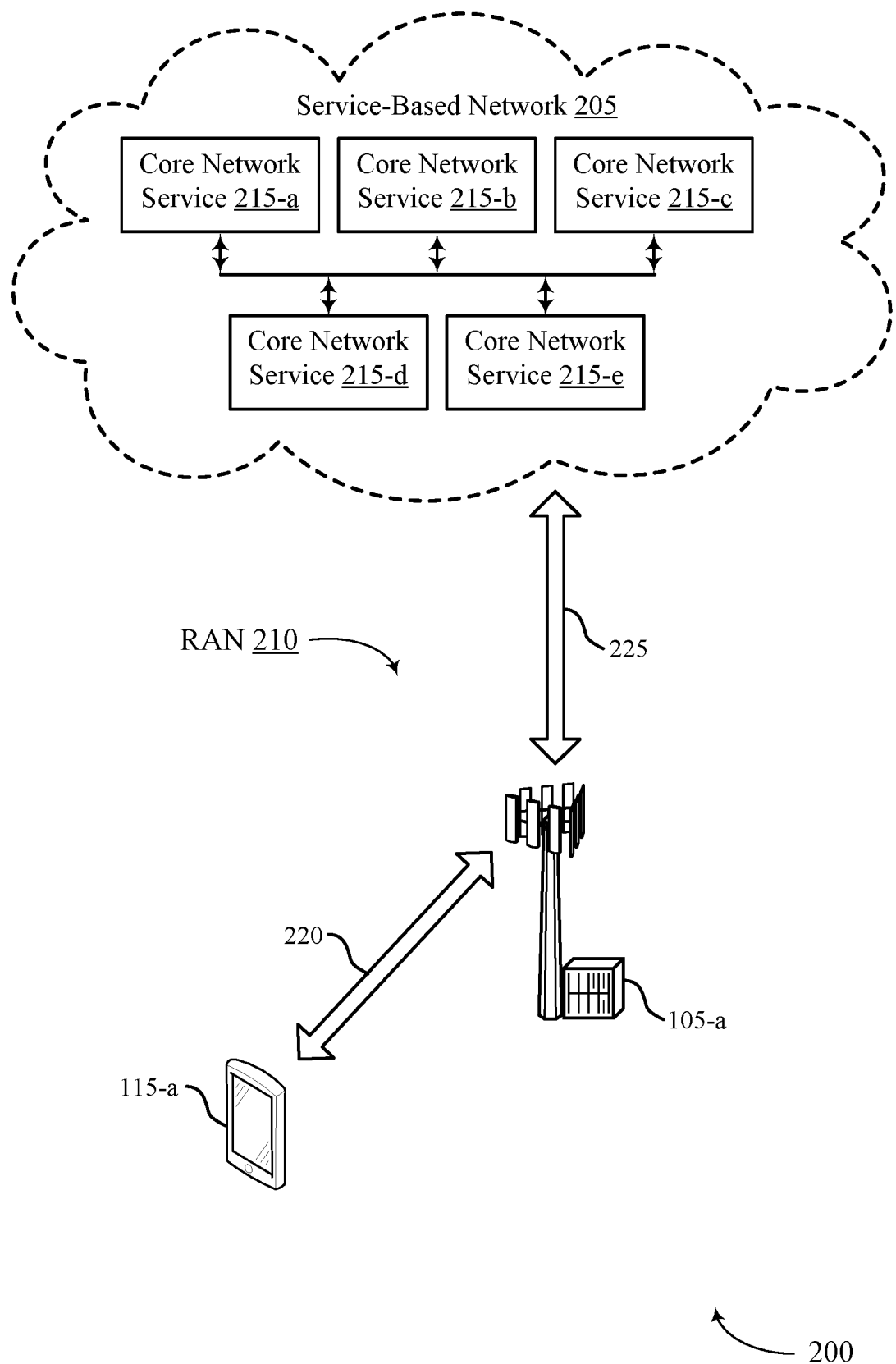
FIG. 2 illustrates an example of a wireless communications system that supports techniques for system information broadcast in a service-based wireless system in accordance with one or more aspects of the present disclosure.

FIG. 2 illustrates an example of a wireless communications system 200 that supports techniques for system information broadcast in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a 6G network as described with reference to FIG. 1.

The wireless communications system 200 may include one or more UEs 115 (e.g., UE 115-*a*), one or more network entities (e.g., network entity 105-*a*), and a service-based network 205. In some aspects, the service-based network 205 may be configured to communicate or interface with a RAN 210 of the wireless communications system 200, where the RAN 210 includes the one or more network entities (e.g., network entity 105-*a*). The service-based network 205 may support or offer a set of core network services 215 (e.g., core network services 215-*a*, 215-*b*, 215-*c*, 215-*d*, 215-*d*, 215-*e*). In some implementations, the service-based network 205 may include or be associated with a cloud platform, where the respective core network services 215 are hosted at respective network addressees in the cloud platform.

The UE 115-*a* may communicate with the network entity 105-*a* using one or more communication links 220, which may include an example of an access link (e.g., a Uu link). The communication link 220 may include a bi-directional link that can include both uplink and downlink communication. Similarly, the network entity 105-*a* of the RAN 210 may be configured to communicate with (e.g., interface with) the service-based network 205 via one or more communication links (e.g., communication ink 225), where the communication link 215 may be configured to facilitate bi-directional communications between the network entity 105-*a* and each of the respective core network services 215 of the service-based network 205.

As shown in FIG. 2, the wireless communications system 200 may exhibit a service-based architecture where the entities of the RAN 210 (e.g., network entity 105-*a*) are configured to connect the UE 115-*a* to core network services 215 of the service-based network 205. In particular, the RAN 210 (e.g., network entity 105-*a*) may be configured to relay communications between the UE 115-*a* and the various core network services 215 of the service-based network to enable the UE 115-*a* to establish and maintain wireless connections with the respective core network services 215 in order to exchange communications associated with the various network functionalities that are supported by the respective core network services 215. In other words, the wireless communications system 200 may enable the UE 115-*a* to "subscribe" to the respective core network services 215 on an á la carte basis depending on the needs or requirements of the UE 115-*a*. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-$a$, network entity 105-$a$).

Different services, functionalities, and core network functions that may be supported or offered by the respective core network services 215 may include, but are not limited to, a mobility service, a security service, a privacy service, a location service, etc. For example, the first core network service 215-$a$ may include a core network mobility service that that hosts information and provides signaling that facilitate the geographical movement of the UE 115-$a$ throughout wireless communications system. By way of another example, the second core network service 215-$b$ may include a security service that provides security and encryption services to subscribing UEs 115 within the wireless communications system 200.

In some aspects, each core network service 215 may include a respective API configured to facilitate wireless communications with the network entity 105-$a$ and the UE 115-$a$, such as the network service APIs 180 illustrated in FIG. 1. APIs at the respective core network services 215 may include routing APIs, configuration APIs, or both. Routing APIs may be configured for service data unit communications between the UE 115-$a$ and the respective core network services 215. Comparatively, configuration APIs may be configured to facilitate communications between the network entity 105-$a$ and the respective core network services 215 to negotiate service requirements and service-specific operation.

In some aspects, the network entity 105-$a$ (e.g., eDU) may facilitate traffic routing (e.g., service data unit routing) from the UE 115-$a$ to the core network services 215, and vice versa. The network entity 105-$a$ may facilitate traffic routing between the respective devices directly, via other network entities 105-$a$, via proxy, or any combination thereof. Moreover, in some cases, the UE 115-$a$ may be communicatively coupled to multiple network entities 105 (e.g., dual connectivity), where the multiple network entities 105 facilitate traffic routing with the same or different sets of core network services 215. Additionally, the network entity 105-$a$ may support service configurations or service contexts associated with communications parameters within the system, such as QoS flows, security, and UE 115 service contexts. In some aspects, the communication link 220 between the network entity 105-$a$ and the UE 115-$a$ may be associated with an access stratum configuration that facilitates over-the-air service awareness. The access stratum configuration may include including logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 (e.g., 6G network) illustrated in FIG. 2 may exhibit several differences and advantages as compared to some other types of wireless systems, such as networks that instead exhibit a relatively more vertical, hierarchal architecture that includes many "layers" of different devices that perform functions for the network. A more hierarchal structure may result in processing and other functions being performed at multiple devices (e.g., network entity 105 and one or more back-end devices), thereby leading to inefficient use of resources and high power consumption. Additionally, the back-end architecture of a network with a more vertical, hierarchal architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CORE and RAN services, which may simplify protocols and reduce a duplication of processing operations across CORE and RAN (e.g., redistribution of CORE and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

In some implementations, as will be described in further detail herein, the wireless communications system 200 may support signaling, configurations, and other mechanisms for distributing system information (e.g., SIBs) in a service-based wireless system. In particular, the wireless communications system 200 may support signaling that enables the network entity 105-$b$ (e.g., DUs) to compile SIB configurations for multiple different core network services 215 of the service-based network 205, and distribute the SIBs for the respective core network services 215 according to the acquired SIB configurations.

Figure 3:
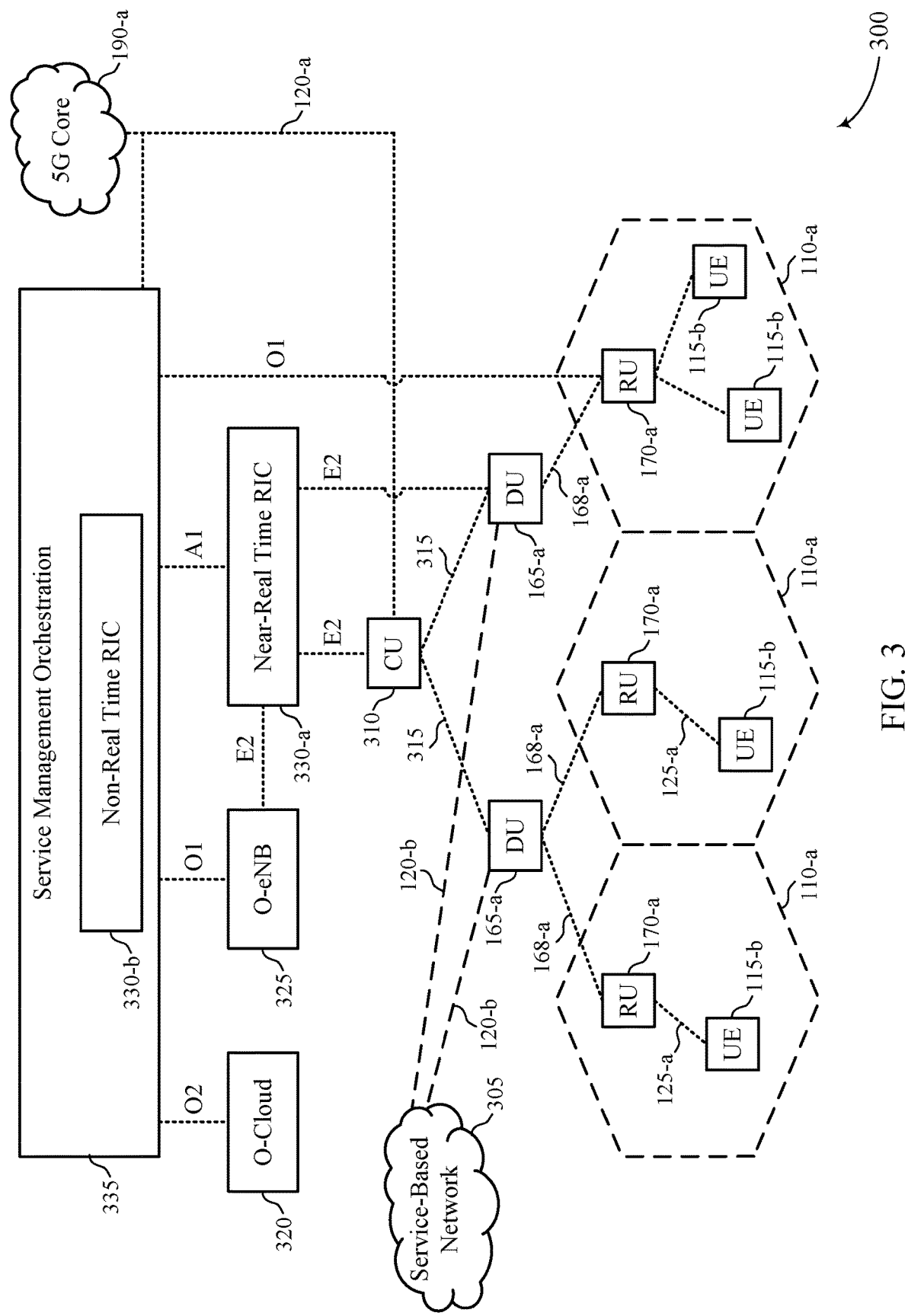
FIG. 3 illustrates an example of a network architecture that supports techniques for system information broadcast in a service-based wireless system in accordance with one or more aspects of the present disclosure.

FIG. 3 illustrates an example of a network architecture 300 (e.g., a disaggregated base station architecture, a disaggregated RAN architecture) that supports techniques for techniques for system information broadcast in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-*a* via links 120-*b*. In this example, DUs 165 may also communicate with one or more CUs 310 that may communicate directly with a 5G core 190-*a* via a backhaul communication link 120-*a*, or indirectly with the 5G core 190-*a* through one or more disaggregated network entities 105 (e.g., a Near-RT RIC 330-*a* via an E2 link, or a Non-RT RIC 330-*b* associated with an SMO 335 (e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-*a*. In some implementations, the SMO 335 may communicate with components configured in accordance with a 4G RAN (e.g., via an O1 interface). Additionally, or alternatively, in some implementations, the SMO 335 may communicate directly with one or more RUs 170-*a* via an O1 interface. The SMO 335 also may include a Non-RT RIC 330-*b* configured to support functionality of the SMO 335.

The Non-RT RIC 330-*b* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-*a*. The Non-RT RIC 330-*b* may be coupled to or communicate with (e.g., via an A1 interface) the Near-RT RIC 330-*a*. The Near-RT RIC 330-*a* may be configured to include a logical function that enables near-real-time control and optimization of RAN elements and resources via data collection and actions over an interface (e.g., via an E2 interface) connecting one or more CUs 310, one or more DUs 165-*a*, or both, as well as an O-eNB 325, with the Near-RT MC 330-*a*.

In some examples, to generate AI/ML models to be deployed in the Near-RT RIC 330-*b*, the Non-RT RIC 330-*b* may receive parameters or external enrichment information from external servers. Such information may be utilized by the Near-RT RIC 330-*a* and may be received at the SMO 335 or the Non-RT RIC 330-*b* from non-network data sources or from network functions. In some examples, the Non-RT RIC 330-*b* or the Near-RT RIC 330-*a* may be configured to tune RAN behavior or performance. For example, the Non-RT RIC 330-*b* may monitor long-term trends and patterns for performance and employ AI or ML models to perform corrective actions through the SMO (e.g., reconfiguration via O1) or via generation of RAN management policies (e.g., A1 policies).

In some implementations, as will be described in further detail herein, the network architecture 300 may support signaling, configurations, and other mechanisms for distributing system information (e.g., SIBs) in a service-based wireless system. In particular, the network architecture 300 may support signaling that enables network entities 105 (e.g., DUs 165) to compile SIB configurations for multiple different core network services of the service-based network, and distribute the SIBs for the respective core network services according to the acquired SIB configurations.

Figure 4:
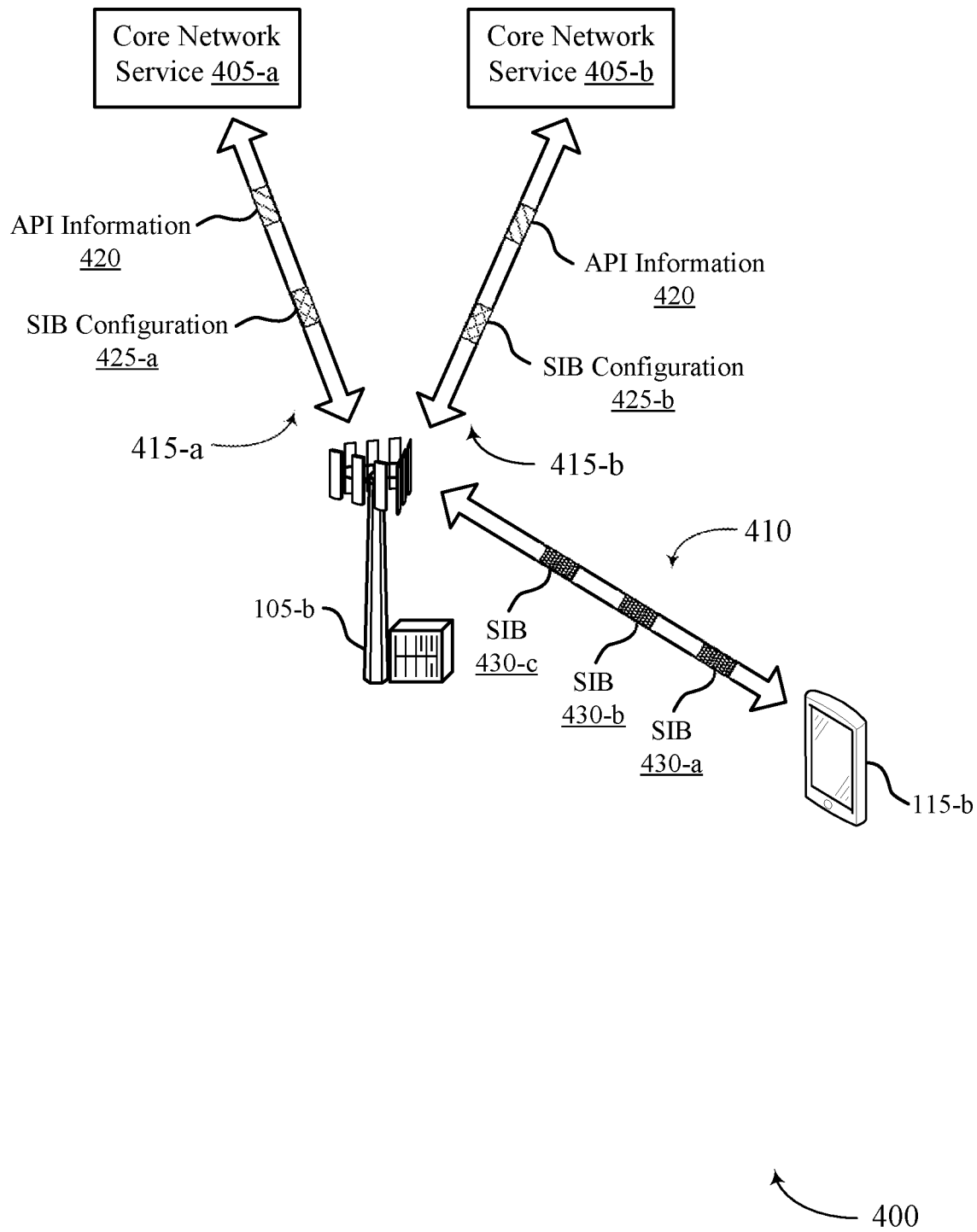
FIG. 4 illustrates an example of a wireless communications system that supports techniques for system information broadcast in a service-based wireless system in accordance with one or more aspects of the present disclosure.

FIG. 4 illustrates an example of a wireless communications system 400 that supports techniques for system information broadcast in a service-based wireless system in accordance with one or more aspects of the present disclosure. In some examples, aspects of the wireless communications system 400 may implement, or be implemented by, aspects of the wireless communications system 100, the wireless communications system 200, the network architecture 300, or any combination thereof. In particular, the wireless communications system 400 may support signaling, configurations, and other mechanisms which enable a network entity 105-*a* to broadcast SIB messages for one or more core network services 405, as described with respect to FIG. 1.

The wireless communications system 400 may include a UE 115-*b*, a network entity 105-*b*, a first core network service 405-*a*, and a second core network service 405-*b*. In some implementations, the network entity 105-*b* may include an example of an O-RAN entity that includes multiple components, such as one or more DUs, as shown and described in FIG. 3. In this regard, the network entity 105-*b* illustrated in FIG. 4 may additionally or alternatively be referred to as a DU (e.g., eDU).

The first core network service 405-*a* and the second core network service 405-*b* may be associated with a service-based network, such as the service-based network 205 illustrated in FIG. 2. In some aspects, the service-based network including the core network services 405-*a*, 405-*b* may be configured to communicate or interface with a RAN of the wireless communications system 400, where the RAN includes the one or more network entities (e.g., network entity 105-*b*). In some implementations, the core network services 405-*a*, 405-*b* may be associated with, or hosted by, a cloud platform, where the respective core network services 405 are hosted at respective network addressees in the cloud platform.

The UE 115-*b* may communicate with the network entity 105-*b* using a communication link 410, which may be an example of an NR, LTE, or 6G link between the UE 115-*b* and the network entity 105-*b*. In some cases, the communication link 410 may include an example of an access link (e.g., Uu link) which may include bi-directional links that enable both uplink and downlink communication. Similarly, the network entity 105-*b* of the RAN may be configured to communicate with (e.g., interface with) the core network services 405 of the service-based network via communication links 415-*a*, 415-*b*, where the communication links 415 may be configured to facilitate bi-directional communications between the network entity 105-*b* and each of the respective core network services 405. In some aspects, each core network service 405-*a*, 405-*b* may include a respective API configured to facilitate wireless communications with the network entity 105-*b* and the UE 115-*b*, such as the network service APIs 180 illustrated in FIG. 1.

In some aspects, the network entity 105-*b* (e.g., eDU) may facilitate traffic routing (e.g., service data unit routing) from the UE 115-*b* to the core network services 405, and vice versa. In other words, the network entity 105-*b* may be configured to relay communications (e.g., service messages) from the UE 115-*b* to the core network services 405, and vice versa. The network entity 105-*b* may facilitate traffic routing between the respective devices directly, via other network entities 105-*b*, via proxy, or any combination thereof.

As noted previously herein, in the context of a service-based wireless system, such the wireless communications system 400 or another service-based 6G network, different core network services 405 may be expected to share information (e.g., system information, such as SIB messages/containers) with UEs 115 and other wireless devices in the network so that the respective devices are able to communicate with the core network services 405. In some conventional systems (e.g., 5G networks), there may be an assumption that one operator is configuring all the parameters (even in network sharing scenarios) for system information that will be compiled at a concentration point (e.g., network entity 105, eNB, gNB) and distributed throughout the network. In such cases, network entities 105 may receive system information from the operator/core network, decode the system information, and package the system information into SIBs that are broadcast to UEs 115.

However, requiring network entities 105 to decode and package SIBs for large quantities of core network services 405 may result in increased complexity and processing power at the network entities 105. Moreover, as compared to some conventional systems which exhibit a centralized back-end network that compiles and packages system information that is to be distributed throughout the network, a service-based system may include many different core network services 405 that are associated with different operators, protocols, and communications parameters (e.g., no one central operator). As such, each respective core network service 405 may have its own system information to broadcast, further complicating the communication of system information within a service-based architecture.

Accordingly, aspects of the present disclosure are directed to signaling, configurations, and other mechanisms for distributing system information (e.g., SIBs) in a service-based wireless system. In particular, aspects of the present disclosure are directed to signaling that enables the network entity 105-*b* (e.g., DU(s) of the network entity 105-*b*) to compile SIB configurations for multiple different core network services 405, and distribute the SIBs for the respective core network services 405 according to the acquired SIB configurations. In other words, aspects of the present disclosure are directed to techniques which enable the RAN (e.g., network entity 105-*b*) to distribute system information for core network services 405.

Additionally, or alternatively, aspects of the present disclosure may enable the network entity 105-*b* to distribute SIB containers/messages associated with communications with the respective core network services 405 (e.g., core network service-specific SIBs), as well as SIB containers/messages associated with communications with the network entity 105-*b* (e.g., RAN-specific or network entity-specific SIBs). In this regard, some aspects of the present disclosure may enable the network entity 105-*b* to distribute system information as a service for the respective core network services 405, thereby enabling the network entity 105-*b* to fulfill QoS requirements for the respective core network services 405 (as compared to some conventional systems in which network entities 105 are simply provided SIBs to transmit at a given schedule).

For example, as shown in FIG. 4, the network entity 105-b may transmit, to the UE 115-b, a SIB container 430-a that includes information associated with communications with the network entity 105-b. In other words, the SIB container may indicate parameters or other characteristics that are usable by the UE 115-b for performing communications with the network entity 105-b (e.g., RAN communications parameters). In other words, the RAN (e.g., network entity 105-b) may advertise system information via the SIB container 430-a, where the system information includes a SIB schedule, RAN-specific system information (e.g., RACH configurations), advertised service availabilities and SIBs, service discovery information (e.g., service discovery for non-advertised core network services 405), and the like.

In some aspects, the network entity 105-b may transmit, to the first core network service 405-a, the second core network service 405-b, an additional core network service 405, or any combination thereof, first signaling indicating API information 420 associated with the network entity 105-b. In some aspects, the API information 420 may be used by the core network services 405 to format and generate signaling and other information (e.g., SIB configurations 425) in such a manner that the signaling or other information may be successfully received via an API at the network entity 105-b. In other words, the network entity 105-b (e.g., DU, eDU) may expose APIs associated with the network entity 105-b to allow the core network services 405 to configure system information for advertisement.

In some cases, the network entity 105-b may transmit the API information 420 to another core network service 405 that is configured to store information associated with network entities 105 within the network, such as applicable coverage areas of network entities 105, capability information of network entities 105, and the like. In such cases, the core network services 505-a, 505-b may be configured to retrieve the API information 420 from the additional core network service 405, such as by querying the additional core network service 405.

In some implementations, the network entity 105-b may receive signaling indicating a first SIB configuration 425-a associated with the first core network service 405-a. Similarly, the network entity 105-b may receive signaling indicating a second SIB configuration 425-b associated with the second core network service 405-b. In some aspects, the first SIB configuration 425-a and the second SIB configuration 425-b may include information associated with communications with the respective core network services 405-a (e.g., parameters for communicating with the respective core network services 405) that is to be relayed/broadcasted to the UE 115-b.

For example, the first SIB configuration 425-a may indicate first information that is to be relayed to the UE 115-b via a first SIB container 430-b, along with an instruction for the network entity 105-b to relay the first SIB container 430-b to the UE 115-b. Similarly, the second SIB configuration 425-b may indicate second information that is to be relayed to the UE 115-b via a second SIB container 430-c, along with an instruction for the network entity 105-b to relay the second SIB container 430-c to the UE 115-b. In some aspects, the core network services 405 may transmit the signaling indicating the respective SIB configurations 425 in accordance with the API information 420 associated with the network entity 105-b. In other words, authorized core network services 405 may format and transmit the signaling indicating the respective SIB configurations 425 so that the signaling is capable of being received by the API at the network entity 105-b.

In some aspects, the SIB configurations 425 may indicate additional parameters or characteristics associated with SIB containers 430 to be relayed on behalf of the respective core network services 405. In other words, each core network service 405 may specify broadcast requirements or parameters associated with corresponding SIB containers 430. Parameters associated with the respective SIB configurations 425 may include, but are not limited to, scheduling information of the respective SIB containers 430 (e.g., periodicity for transmitting/broadcasting SIB containers 430), a size of the respective SIB containers 430, QoS metrics for the respective SIB containers 430, a delivery delay for the respective SIB containers 430 (e.g., delay to deliver), a coverage area for the respective SIB containers 430 (e.g., coverage requirements), reliability metrics for the respective SIB containers 430 (e.g., reliability requirements), or any combination thereof. By way of another example, in some cases, the SIB configurations 425 may indicate a format of the respective SIB containers 430, such as a type-length-value (TLV) associated with the SIB containers 430, an Internet Assigned Numbers Authority (IANA) service number associated with the SIB containers 430, etc.

Additionally, the SIB configurations 425 may indicate whether the SIB containers 430 associated with the respective SIB configurations 425 are to be continually or periodically transmitted by the network entity 105-b, or whether the respective SIB containers 430 are to be communicated on-demand (e.g., in response to requests from the UE 115-b). That is, the network entity 105-b may be configured to provide SIBs on-demand per-core network service 405 or per group of core network services 405 (e.g., aggregation to save round trips).

In some implementations, a single core network service 405 may include multiple SIBs (e.g., multiple SIB containers 430) that are to be communicated to the UE 115-b. For example, the first SIB configuration 425-a may include multiple sets of information that are to be communicated to the UE 115-b via multiple SIB containers 430. In such cases, the first SIB configuration 425-a may include multiple SIB containers 430 that are to be relayed to the UE 115-b, along with instructions for the network entity 105-b to relay the SIB containers 430.

In some implementations, the core network services 405 may "subscribe" to one or more network entities 105 for relaying SIB containers 430 to UEs 115 within the wireless communications system 400. The core network services 405 may subscribe to network entities 105 for relaying system information based on network topology or other operator configurations (e.g., request frequency, delay to deliver, coverage, etc.). As described previously herein, the core network services 405 may obtain information associated with network entities 105 that may be used to relay system information from the respective network entities 105 themselves, from another core network service 405 that stores information associated with the network/network entities 105, or both.

In some aspects, the network entity 105-b may transmit, to the UE 115-b, scheduling information associated with the respective SIB containers 430 so that the UE 115-b may monitor for the respective SIB containers 430. In other words, the network entity 105-b (e.g., DU/eDU of the network entity 105-b) may be configured to transmit/broadcast SIB schedules for different core network services 405, including Access Stratum (AS) and RAN SIBs added by the network entity 105-*b*. Moreover, the network entity 105-*b* may be configured to broadcast service availabilities (e.g., broadcast available/offered core network services 405), if requested to be advertised.

For example, the network entity 105-*b* may transmit first scheduling information (e.g., a first periodicity) associated with the first SIB container 430-*b*, and second scheduling information (e.g., a second periodicity) associated with the second SIB container 430-*c*. In some aspects, the network entity 105-*b* may indicate other parameters or characteristics associated with the SIB containers 430, such as the size, delivery delay, coverage areas, etc. In this regard, the network entity 105-*b* may transmit the scheduling information based on transmitting the API information 420, receiving the first SIB configuration 425-*a*, receiving the second SIB configuration 425-*b*, or any combination thereof. The scheduling information may be communicated via RRC signaling, DCI signaling, MAC-CE signaling, system information signaling, or any combination thereof.

In some implementations, the network entity 105-*b* may transmit or broadcast scheduling information for all core network services 505 offered or supported by the network entity 105-*b* and/or the service-based network so that the respective UEs 115 may monitor for SIBs associated with the core network services 505 to which they are to subscribe. In some aspects, the network entity 105-*b* may indicate which (if any) SIB containers 430 are to be communicated on-demand in response to requests from the UE 115-*b*. For example, the network entity 105-*b* may indicate that the first SIB container 430-*b* will be broadcasted according to a regular periodicity, but that the second SIB container 430-*c* will be communicated on-demand (e.g., communicated in response to requests from the UE 115-*b*).

In some aspects, the network entity 105-*b* may receive, from the UE 115-*b*, a request for the first SIB container 430-*b*, the second SIB container 430-*c*, or both. In particular, the UE 115-*b* may transmit the request based on receiving an indication that one of the first or second SIB containers 430 are to be communicated on-demand in response to requests from the UE 115-*b*. As such, the UE 115-*b* may transmit the request based on receiving the signaling indicating the scheduling information and/or other parameters of the SIB containers 430.

The network entity 105-*b* may transmit (e.g., broadcast) the first SIB container 430-*b* (e.g., SIB message) associated with the first core network service 405-*a* to the UE 115-*b*. Similarly, the network entity 105-*b* may transmit (e.g., broadcast) the second SIB container 430-*c* (e.g., SIB message) associated with the second core network service 405-*b* to the UE 115-*b*. In some implementations, the SIB containers may be transmitted via the MAC layer, the physical layer. For example, the network entities 105 may perform concatenation for the SIB containers, and transmit the bits of the SIB containers via both the MAC and physical layer.

As noted previously herein, the respective SIB containers 430 may include information that may be used for communicating with the respective core network service 405-*a*. For example, the first SIB container 430-*b* may include information associated with communications with the first core network service 405-*a*, and the second SIB container 430-*c* may include information associated with communications with the second core network service 405-*b*.

The network entity 105-*b* may transmit the SIB containers 430-*b*, 430-*c* based on receiving the SIB configurations 425-*a*, 425-*b*, transmitting the scheduling information, receiving a request from the UE 115-*b*, or any combination thereof. For example, the network entity 105-*b* may transmit the first SIB container 430-*b* in accordance with the scheduling information which was communicated via the first SIB configuration 425-*a*, and/or the scheduling information communicated to the UE 115-*b*. By way of another example, the network entity 105-*b* may transmit the second SIB container 430-*c* in response to receiving a request for the second SIB container 430-*c*.

In some implementations, the network entity 105-*b* may transmit or relay the SIB containers 430-*b*, 430-*c* associated with the respective core network services 405 without decoding the respective SIB containers 430. That is, the first SIB container 430-*b* and/or the second SIB container 430-*c* may be transparent to the network entity 105-*b* in that the network entity 105-*b* is unable understand, decode, and/or build the respective SIB containers 430-*b*, 430-*c*. For example, the first SIB configuration 425-*a* may include the first SIB container 430-*b*, and the network entity 105-*b* may be configured to relay the first SIB container 430-*b* to the UE 115-*b* without decoding the first SIB container 430-*b*. In this regard, at least a portion of the first SIB configuration 425-*a* may be transparent to the network entity 105-*b*.

Moreover, as noted previously herein, in some implementations, the network entity 105-*b* may be configured to transmit, broadcast, or relay multiple SIB containers 430 for a single core network service 405. For example, the first SIB configuration 425-*a* may include first information that is to be relayed via the first SIB container 430-*b*, and additional information that is to be relayed via an additional SIB container 430. In some implementations, transparent SIB containers 430 from the same core network service 405 may be aggregated if the respective SIB containers 430 are to be transmitted by the network entity 105-*b* at the same time.

Subsequently, the network entity 105-*b* may relay service messages between the UE 115-*b*, the first core network service 405-*a*, and the second core network service 405-*b* based on the relayed system information (e.g., based on the SIB containers 430). In other words, the UE 115-*b* may communicate with the respective core network services 405 (e.g., transmit and receive service messages) via a relay provided by the network entity 105-*b* and in accordance with the information communicated via the respective SIB containers 430.

For example, the UE 115-*b* may communicate service messages with the first core network service 405-*a* (via the network entity 105-*b*) based on the information included within the first SIB container 430-*b*. Similarly, by way of another example, the UE 115-*b* may communicate service messages with the second core network service 405-*b* (via the network entity 105-*b*) based on the information included within the second SIB container 430-*c*. Moreover, the UE 115-*b* and the network entity 105-*b* may communicate with one another (e.g., transmit, receive, and relay service messages) in accordance with the RAN-specific SIB container 430-*a* associated with communications with the network entity 105-*b*.

Techniques described herein may enable the network entity 105-*b* to broadcast system information to UEs 115 on behalf of core network services 405 of a service-based network. Moreover, techniques described herein may enable the network entity 105-*b* to receive SIB containers 430 from core network services 405, and relay the SIB containers to the UE 115-*b* without decoding the respective SIB containers 430 (e.g., transparent SIB containers 430). In this regard, aspects of the present disclosure may enable the network entity 105-*b* to efficiently aggregate system information from a multitude of core network services 405, and relay the system information to other wireless devices, thereby enabling the efficient communication of system information and facilitating more efficient and reliable wireless communications. Moreover, by enabling the network entity 105-*b* to relay SIB containers 430 without decoding the SIB containers 430, techniques described herein may reduce processing requirements at the network entities 105, thereby reducing complexity and power consumption of the network.

Figure 5:
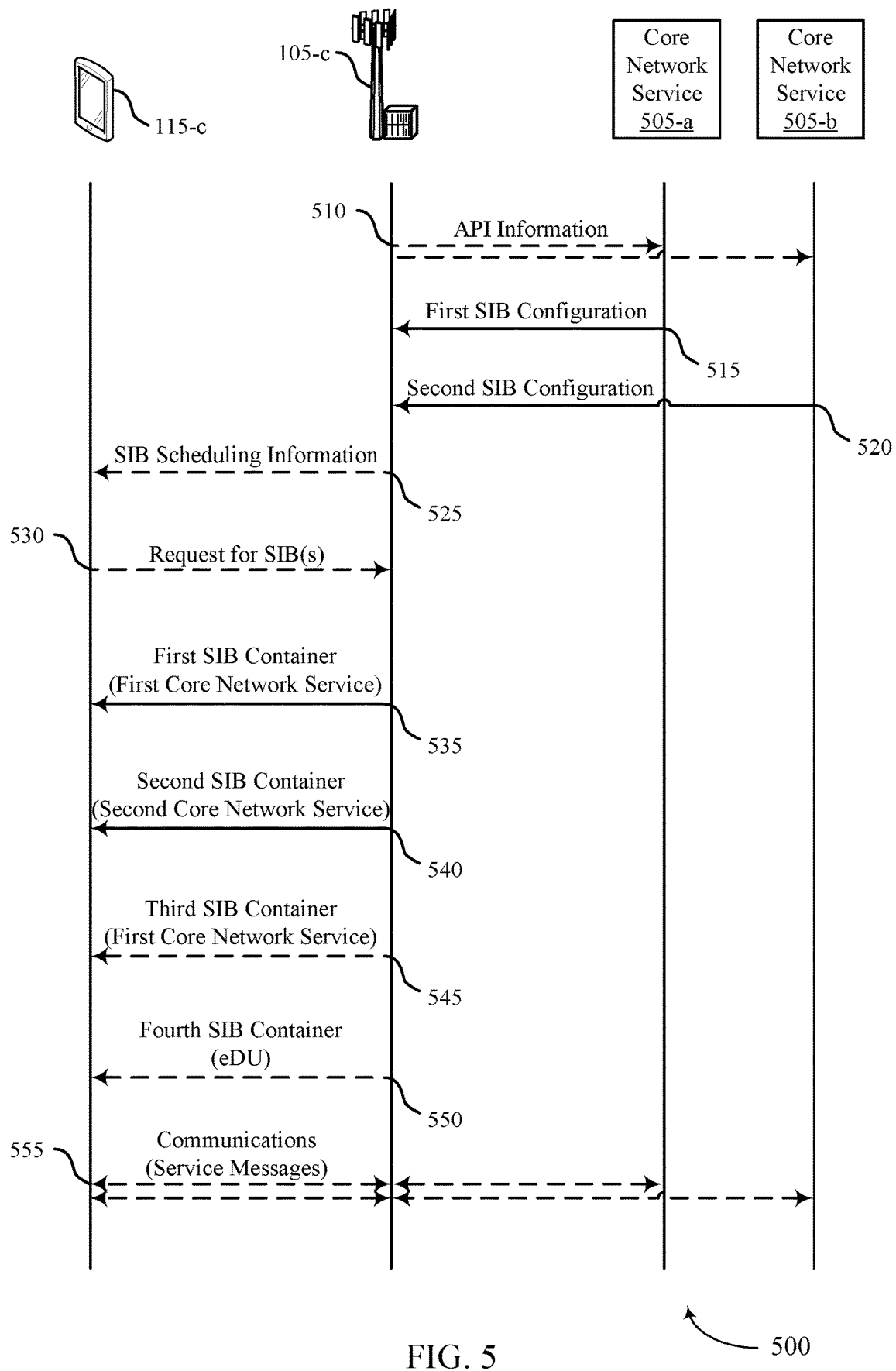
FIG. 5 illustrates an example of a process flow that supports techniques for system information broadcast in a service-based wireless system in accordance with one or more aspects of the present disclosure.

FIG. 5 illustrates an example of a process flow 500 that supports techniques for system information broadcast in a service-based wireless system in accordance with one or more aspects of the present disclosure. In some examples, aspects of the process flow 500 may implement, or be implemented by, aspects of the wireless communications system 100, the wireless communications system 200, the network architecture 300, the wireless communications system 400, or any combination thereof. In particular, the process flow 500 illustrates signaling between a network entity 105-*c* (e.g., eDU) and multiple core network services 505-*a*, 505-*b* that enables the network entity 105-*c* to aggregate SIB configurations for the respective core network services 505, and relay SIB containers to a UE 115-*c* in accordance with the SIB configurations, as described with reference to FIGS. 1-4, among other aspects.

The process flow 500 may include a UE 115-*c*, a network entity 105-*c* (e.g., eDU), a first core network service 505-*a*, and a second core network service 505-*b*, which may be examples of UEs 115, network entities 105, core network services, and other wireless devices described with reference to FIGS. 1-4. For example, the UE 115-*c* and the network entity 105-*c* illustrated in FIG. 5 may be examples of the UE 115-*c* and the network entity 105-*c*, as illustrated in FIG. 4. In this regard, the network entity 105-*c* may include, or be associated with, a DU (e.g., eDU). Similarly, the first core network service 505-*a* and the second core network service 505-*b* illustrated in FIG. 5 may be examples of the first core network service 405-*a* and the second core network service 405-*b*, as illustrated in FIG. 4.

In some aspects, the first core network service 505-*a* and the second core network service 505-*b* may be included within a set of services offered or provided by a service-based network, such as the service-based network 205 illustrated in FIG. 2. In such cases, the service-based network including the core network services 505 may be configured to interface with (e.g., communicate with) a RAN including the network entity 105-*c* (e.g., eDU) in order to facilitate communications between the service-based network and the UE 115-*c*. In this regard, the signaling illustrated in FIG. 5 may include example signaling within a network with a service-based architecture, such as a 6G system.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 510, the network entity 105-*c* may transmit, to the first core network service 505-*a*, the second core network service 505-*b*, an additional core network service 505, or any combination thereof, first signaling indicating API information associated with the network entity 105-*c*. In some aspects, the API information may be used by the core network services 505 to format and generate signaling and other information (e.g., SIB configurations) in such a manner that the signaling or other information may be successfully received via an API at the network entity 105-*c*.

In some cases, the network entity 105-*c* may transmit the API information to another core network service 505 that is configured to store information associated with network entities 105 within the network, such as applicable coverage areas of network entities 105, capability information of network entities 105, and the like. In such cases, the core network services 505-*a*, 505-*b* may be configured to retrieve the API information from the additional core network service 505 (e.g., by querying the additional core network service 505). In additional or alternative implementations, an additional core network service 505, such as a discovery service, may acquire APIs associated with respective network entities 105 and provide the APIs to the respective core network services 505.

At 515, the network entity 105-*c* may receive, from the first core network service 505-*a*, signaling indicating a first SIB configuration associated with the first core network service 505-*a*. In some aspects, the first SIB configuration may include first information associated with communications with the first core network service 505-*a* (e.g., parameters for communicating with the first core network service 505-*a*). In other words, the first SIB configuration may indicate first information that is to be relayed to the UE 115-*c* via a first SIB container, along with an instruction for the network entity 105-*c* to relay the first SIB container to the UE 115-*c*. In some aspects, the first core network service 505-*a* may transmit the first SIB configuration in accordance with the API information associated with the network entity 105-*c* which was obtained at 510. In other words, the first core network service 505-*a* may format and transmit the signaling indicating the first SIB configuration so that the signaling is capable of being received by the API at the network entity 105-*c*.

In some aspects, the signaling indicating the first SIB configuration may indicate additional parameters or characteristics associated with SIBs to be relayed for the first core network service 505-*a*. Parameters associated with the first SIB configuration of the first core network service 505-*a* may include, but are not limited to, scheduling information of the first SIB container (e.g., periodicity for transmitting/broadcasting the first SIB container), a size of the first SIB container, a QoS metric for the first SIB container, a delivery delay for the first SIB container, a coverage area for the first SIB container, or any combination thereof. Additionally, the first SIB configuration may indicate whether the first SIB container is to be continually or periodically transmitted by the network entity 105-*c*, or whether the first SIB container is to be communicated on-demand (e.g., in response to requests from UEs 115).

In some implementations, the core network service 505-*a* may include multiple SIBs (e.g., SIB containers) that are to be communicated to the UE 115-*c*. In such cases, the SIB configuration may include multiple SIB containers that are to be relayed to the UE 115-*c*, along with instructions to relay the SIB containers. For example, the SIB configuration may include a first SIB container including first information associated with communications with the first core network service 505-*a*, and an additional SIB container including additional information associated with communications with the first core network service 505-*a*. In such cases, the SIB configuration may indicate parameters for each of the respective SIB containers (e.g., scheduling information, sizes of the SIB containers, whether the SIB containers are on-demand, etc.).

At 520, the network entity 105-*c* may receive, from the second core network service 505-*b*, signaling indicating a second SIB configuration associated with the second core network service 505-*b*. The second SIB configuration may include second information associated with communications with the second core network service 505-*b* (e.g., parameters for communicating with the second core network service 505-*b*). In other words, as described previously herein, the second SIB configuration may indicate second information that is to be relayed to the UE 115-*c* via a second SIB container, along with an instruction for the network entity 105-*c* to relay the second SIB container to the UE 115-*c*.

In some aspects, the second core network service 505-*b* may transmit the second SIB configuration in accordance with the API information associated with the network entity 105-*c* which was obtained at 510. Moreover, as described previously herein with respect to the first SIB configuration at 515, the second SIB configuration may indicate additional parameters or characteristics associated with the second SIB container (e.g., scheduling information of the second SIB container, a size of the second SIB container, a QoS metric for the second SIB container, a delivery delay for the second SIB container, a coverage area for the second SIB container, whether the second SIB container is to be communicated on-demand in response to requests, etc.). Further, in some aspects, the second SIB configuration may indicate or include multiple SIB containers including different information for communicating with the second core network service 505-*b*, where each respective SIB container may be associated with a respective set of communication parameters.

At 525, the network entity 105-*c* may transmit, to the UE 115-*c*, scheduling information associated with the respective SIB containers so that the UE 115-*c* may monitor for the respective SIB containers. For example, the network entity 105-*c* may transmit first scheduling information (e.g., first periodicity) associated with the first SIB container, and second scheduling information (e.g., second periodicity) associated with the second SIB container. In some aspects, the network entity 105-*c* may indicate other parameters or characteristics associated with the SIB containers, such as the size, delivery delay, coverage areas, etc. In this regard, the network entity 105-*c* may transmit the scheduling information based on transmitting the API information at 510, receiving the signaling indicating the first SIB configuration at 515, receiving the signaling indicating the second SIB configuration at 520, or any combination thereof. The scheduling information may be communicated via RRC signaling, DCI signaling, MAC-CE signaling, system information signaling, or any combination thereof.

In some implementations, the network entity 105-*c* may transmit or broadcast scheduling information for all core network services 505 offered or supported by the network entity 105-*c* and/or the service-based network so that the respective UEs 115 may monitor for SIBs associated with the core network services 505 to which they are to subscribe. In some aspects, the network entity 105-*c* may indicate which (if any) SIB containers are to be communicated on-demand in response to requests from the UE 115-*c*. For example, the network entity 105-*c* may indicate that the first SIB container will be broadcasted according to a regular periodicity, but that the second SIB container will be communicated on-demand (e.g., communicated in response to requests from the UE 115-*c*).

At 530, the network entity 105-*c* may receive, from the UE 115-*c*, a request for the first SIB container, the second SIB container, or both. In particular, the UE 115-*c* may transmit the request at 530 based on receiving an indication that one of the first or second SIB containers are to be communicated on-demand in response to requests from the UE 115-*c*. As such, the UE 115-*c* may transmit the request at 530 based on receiving the signaling indicating the scheduling information and/or other parameters of the SIB containers at 525.

At 535, the network entity 105-*c* may transmit (e.g., broadcast) the first SIB container (e.g., SIB message) associated with the first core network service 505-*a* to the UE 115-*c*. As noted previously herein, the first SIB container may include first information that may be used for communicating with the first core network service 505-*a*. The network entity 105-*c* may transmit the first SIB container at 535 based on receiving the first SIB configuration at 515, transmitting the scheduling information at 525, receiving the request at 530, or any combination thereof. For example, the network entity 105-*c* may transmit the first SIB container in accordance with the scheduling information which was communicated via the first SIB configuration at 515, and/or the scheduling information communicated to the UE 115-*c* at 525. By way of another example, the network entity 105-*c* may transmit the first SIB container at 535 in response to receiving a request for the first SIB container at 530.

In some implementations, the network entity 105-*c* may transmit or relay the first SIB container to the UE 115-*c* without decoding the first SIB container. That is, the first SIB container may be transparent to the network entity 105-*c* in that the network entity 105-*c* is unable to understand or decode the SIB container. For example, the first SIB configuration at 515 may include the first SIB container, and the network entity 105-*c* may be configured to relay the first SIB container to the UE 115-*c* without decoding the first SIB container. In this regard, at least a portion of the first SIB configuration may be transparent to the network entity 105-*c*.

At 540, the network entity 105-*c* may transmit (e.g., broadcast) the second SIB container (e.g., SIB message) associated with the second core network service 505-*b* to the UE 115-*c*. As noted previously herein, the first SIB container may include first information that may be used for communicating with the first core network service 505-*a*. The network entity 105-*c* may transmit the second SIB container at 540 based on receiving the second SIB configuration at 520, transmitting the scheduling information at 525, receiving the request at 530, or any combination thereof. For example, the network entity 105-*c* may transmit the second SIB container in accordance with the scheduling information which was communicated via the second SIB configuration at 520, and/or the scheduling information communicated to the UE 115-*c* at 525. By way of another example, the network entity 105-*c* may transmit the second SIB container at 540 in response to receiving a request for the second SIB container at 530.

As noted previously herein with respect to the first SIB container, in some implementations, the network entity 105-*c* may transmit or relay the second SIB container to the UE 115-*c* without decoding the second SIB container. That is, the first SIB container may be transparent to the network entity 105-*c* in that the network entity 105-*c* is unable to understand or decode the SIB container.

At 545, the network entity 105-*c* may transmit (e.g., broadcast) a third SIB container (e.g., SIB message) associated with the first core network service 505-*a* to the UE 115-c. In this regard, the first core network service 505-a may be associated with both the first SIB container and the third SIB container. In this example, the respective SIB containers may include different information associated with communications with the first core network service 505-a. Moreover, both the first and third SIB containers (as well as parameters for communicating the SIB containers) may be included or indicated within the first SIB configuration. Further, as noted previously herein with respect to the first and second SIB containers, in some implementations, the network entity 105-c may transmit or relay the third SIB container to the UE 115-c without decoding the third SIB container.

At 550, the network entity 105-c may transmit, to the UE 115-c, a fourth SIB container (e.g., fourth SIB message) that includes information associated with communications with the network entity 105-c. In other words, as compared to the first and second SIB containers that are associated with communications with the first and second core network services 505, respectively, the fourth SIB container may include information that is usable for communicating with the network entity 105-c (e.g., RAN communications parameters). In this regard, the network entity 105-c may be configured to transmit or broadcast both core network service 505 specific SIB containers, and network entity 105-c specific SIB containers.

While the fourth SIB container associated with communications with the network entity 105-c is shown at 550, this is not to be regarded as a limitation of the present disclosure, unless noted otherwise herein. For example, in some implementations, the network entity 105-c may transmit the fourth SIB container during a connection establishment procedure between the UE 115-c and the network entity 105-c. In such cases, the communications between the UE 115-c and the network entity 105-c shown in FIG. 5 may be based on the information included in the fourth SIB container.

At 555, the network entity 105-c may relay service messages between the UE 115-c, the first core network service 505-a, and the second core network service 505-b. In other words, the UE 115-c may communicate with the respective core network services 505 (e.g., transmit and receive service messages) via a relay provided by the network entity 105-c. In particular, the network entity 105-c may relay service messages between the UE 115-c and the respective core network services 505 in accordance with the information communicated via the respective SIB containers. Moreover, the UE 115-c and the network entity 105-c may communicate with one another (e.g., transmit, receive, and relay service messages) in accordance with the fourth SIB container associated with communications with the network entity 105-c.

For example, the UE 115-c may communicate service messages with the first core network service 505-a (via the network entity 105-c) based on the information included within the first SIB container and/or the third SIB container. Similarly, by way of another example, the UE 115-c may communicate service messages with the second core network service 505-b (via the network entity 105-c) based on the information included within the second SIB container.

Figure 6:
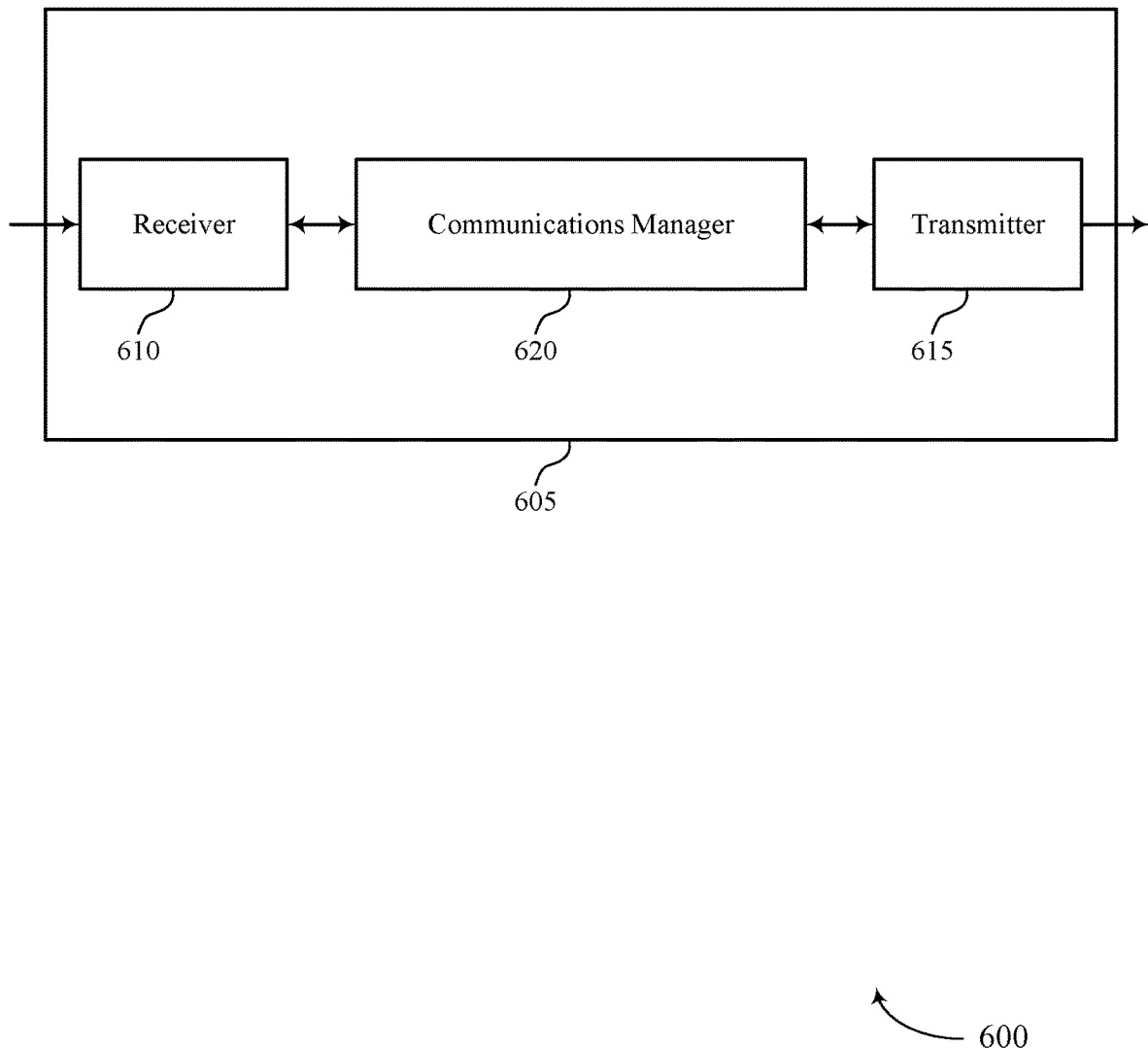
FIGS. 6 and 7 show block diagrams of devices that support techniques for system information broadcast in a service-based wireless system in accordance with one or more aspects of the present disclosure.

FIG. 6 shows a block diagram 600 of a device 605 that supports techniques for system information broadcast in a service-based wireless system in accordance with one or more aspects of the present disclosure. The device 605 may be an example of aspects of a network entity 105 (e.g., DU) as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of techniques for system information broadcast in a service-based wireless system as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for receiving, from a first core network service offered by a service-based network, first signaling indicating a first SIB configuration associated with the first core network service, the first SIB configuration including first information associated with communications with the first core network service. The communications manager 620 may be configured as or otherwise support a means for receiving, from a second core network service offered by the service-based network, second signaling indicating a second SIB configuration associated with the second core network service, the second SIB configuration including second information associated with communications with the second core network service. The communications manager 620 may be configured as or otherwise support a means for transmitting, to one or more UEs, a first SIB container including the first information. The communications manager 620 may be configured as or otherwise support a means for transmitting, to the one or more UEs, a second SIB container including the second information.

For example, the communications manager 620 may be configured as or otherwise support a means for transmitting, to a DU, first signaling indicating a SIB configuration associated with the core network service, the SIB configuration including first information associated with communications with the core network service. The communications manager 620 may be configured as or otherwise support a means for transmitting, to the DU based on the SIB configuration, an instruction for the DU to communicate the first information to one or more UEs via a first SIB container. The communications manager 620 may be configured as or otherwise support a means for communicating a service message with a UE of the one or more UEs based on the instruction.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable network entities 105 to broadcast system information to UEs 115 on behalf of core network services of the service-based network 130. Moreover, techniques described herein may enable network entities 105 to receive SIB containers from core network services, and relay the SIB containers to UEs 115 without decoding the respective SIB containers (e.g., transparent SIB containers). In this regard, aspects of the present disclosure may enable network entities 105 to efficiently aggregate system information from a multitude of core network services, and relay the system information to other wireless devices, thereby enabling the efficient communication of system information and facilitating more efficient and reliable wireless communications. Moreover, by enabling network entities 105 to relay SIB containers without decoding the SIB containers, techniques described herein may reduce processing requirements at the network entities 105, thereby reducing complexity and power consumption of the network.

Figure 7:
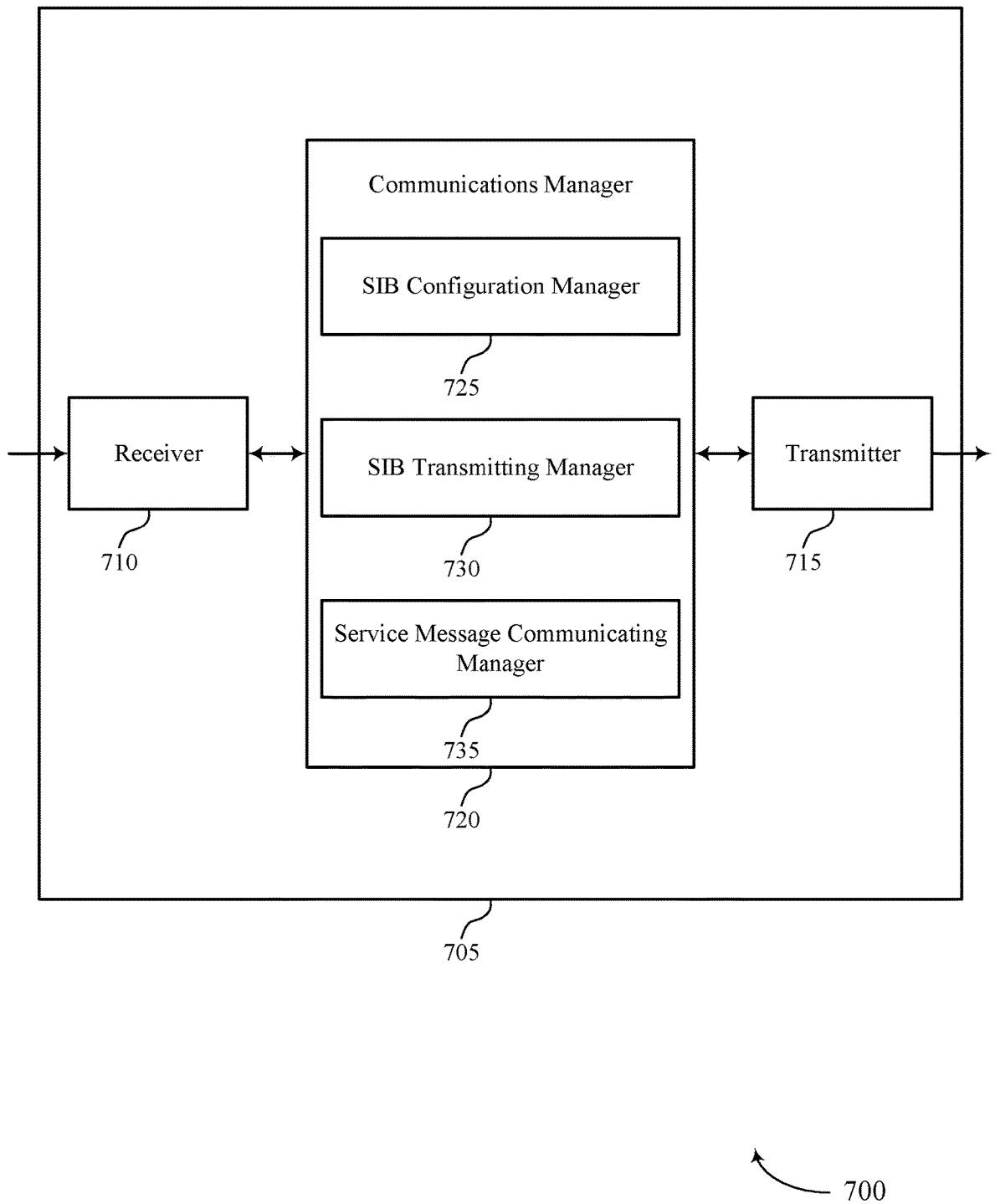

FIG. 7 shows a block diagram 700 of a device 705 that supports techniques for system information broadcast in a service-based wireless system in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of techniques for system information broadcast in a service-based wireless system as described herein. For example, the communications manager 720 may include an SIB configuration manager 725, an SIB transmitting manager 730, a service message communicating manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The SIB configuration manager 725 may be configured as or otherwise support a means for receiving, from a first core network service offered by a service-based network, first signaling indicating a first SIB configuration associated with the first core network service, the first SIB configuration including first information associated with communications with the first core network service. The SIB configuration manager 725 may be configured as or otherwise support a means for receiving, from a second core network service offered by the service-based network, second signaling indicating a second SIB configuration associated with the second core network service, the second SIB configuration including second information associated with communications with the second core network service. The SIB transmitting manager 730 may be configured as or otherwise support a means for transmitting, to one or more UEs, a first SIB container including the first information. The SIB transmitting manager 730 may be configured as or otherwise support a means for transmitting, to the one or more UEs, a second SIB container including the second information.

The SIB configuration manager 725 may be configured as or otherwise support a means for transmitting, to a DU, first signaling indicating a SIB configuration associated with the core network service, the SIB configuration including first information associated with communications with the core network service. The SIB configuration manager 725 may be configured as or otherwise support a means for transmitting, to the DU based on the SIB configuration, an instruction for the DU to communicate the first information to one or more UEs via a first SIB container. The service message communicating manager 735 may be configured as or otherwise support a means for communicating a service message with a UE of the one or more UEs based on the instruction.

Figure 8:
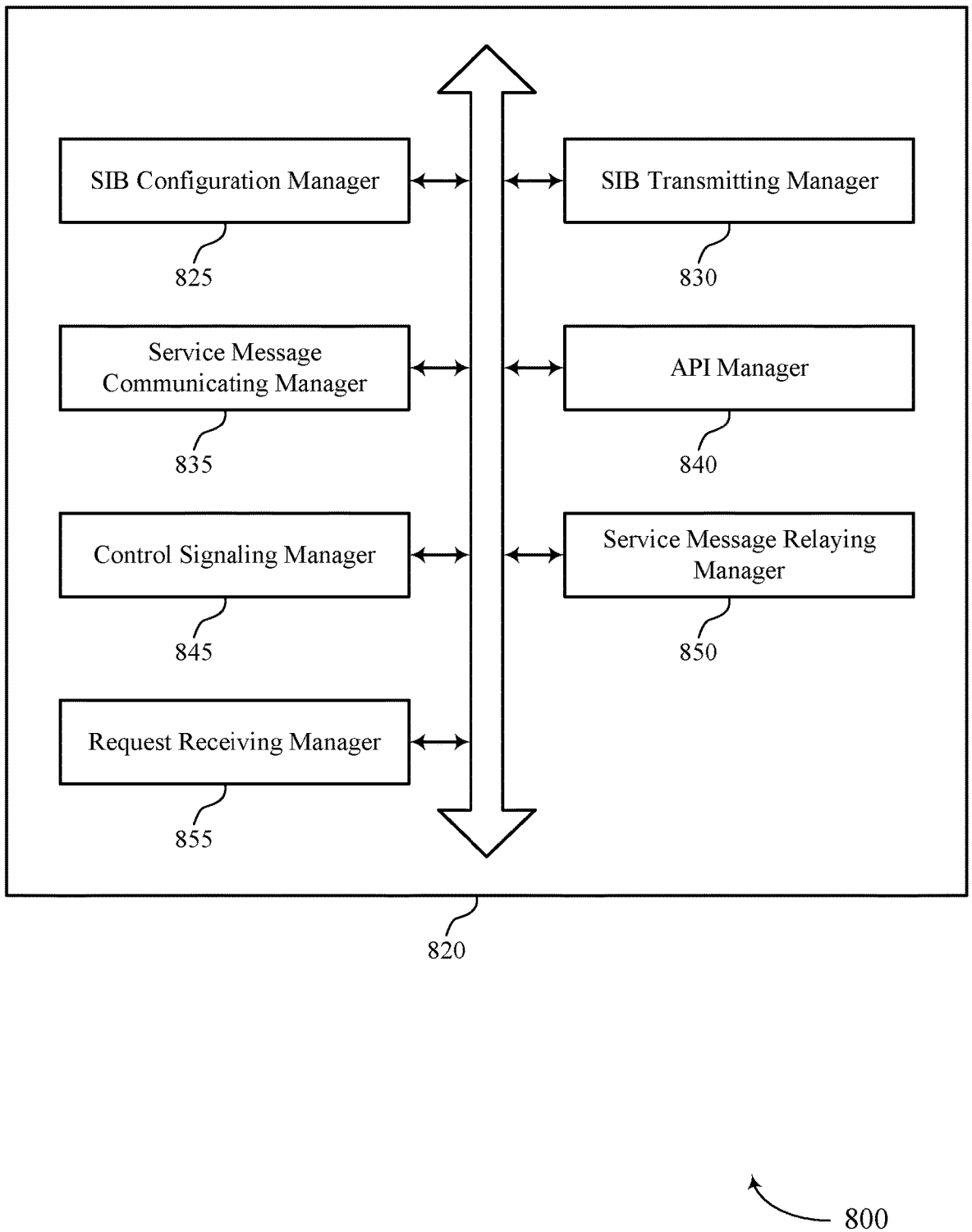
FIG. 8 shows a block diagram of a communications manager that supports techniques for system information broadcast in a service-based wireless system in accordance with one or more aspects of the present disclosure.

FIG. 8 shows a block diagram 800 of a communications manager 820 that supports techniques for system information broadcast in a service-based wireless system in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for system information broadcast in a service-based wireless system as described herein. For example, the communications manager 820 may include an SIB configuration manager 825, an SIB transmitting manager 830, a service message communicating manager 835, an API manager 840, a control signaling manager 845, a service message relaying manager 850, a request receiving manager 855, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The SIB configuration manager 825 may be configured as or otherwise support a means for receiving, from a first core network service offered by a service-based network, first signaling indicating a first SIB configuration associated with the first core network service, the first SIB configuration including first information associated with communications with the first core network service. In some examples, the SIB configuration manager 825 may be configured as or otherwise support a means for receiving, from a second core network service offered by the service-based network, second signaling indicating a second SIB configuration associated with the second core network service, the second SIB configuration including second information associated with communications with the second core network service. The SIB transmitting manager 830 may be configured as or otherwise support a means for transmitting, to one or more UEs, a first SIB container including the first information. In some examples, the SIB transmitting manager 830 may be configured as or otherwise support a means for transmitting, to the one or more UEs, a second SIB container including the second information.

In some examples, the SIB configuration manager 825 may be configured as or otherwise support a means for receiving, via the first signaling, a first set of parameters associated with the first SIB configuration, where the first set of parameters includes scheduling information of the first SIB container, a size of the first SIB container, a quality of service metric for the first SIB container, a delivery delay for the first SIB container, a coverage area for the first SIB container, or any combination thereof, where the first SIB container is transmitted in accordance with the first set of parameters.

In some examples, the SIB configuration manager 825 may be configured as or otherwise support a means for receiving, via the first signaling, an indication that SIB containers associated with the first SIB configuration are to be provided on-demand in response to requests from the one or more UEs, where transmitting the first SIB container is based on the indication.

In some examples, the control signaling manager 845 may be configured as or otherwise support a means for transmitting, to the one or more UEs, the indication that SIB containers associated with the first SIB configuration are to be provided on-demand in response to requests from the one or more UEs. In some examples, the request receiving manager 855 may be configured as or otherwise support a means for receiving, from a UE of the one or more UEs, a request for the first SIB container based on transmitting the indication, where the first SIB container is transmitted to the UE in response to the request.

In some examples, the SIB transmitting manager 830 may be configured as or otherwise support a means for transmitting, to the one or more UEs, a third SIB container including third information associated with communications between the DU and the one or more UEs.

In some examples, the API manager 840 may be configured as or otherwise support a means for transmitting, the first core network service, the second core network service, an additional core network service, or any combination thereof, third signaling indicating API information associated with the DU, where the first signaling, the second signaling, or both, are received in accordance with the API information.

In some examples, the control signaling manager 845 may be configured as or otherwise support a means for transmitting, to the one or more user equipments, third signaling indicating first scheduling information associated with the first SIB container and second scheduling information associated with the second SIB container, where the first SIB container and the second SIB container are transmitted in accordance with the first scheduling information and the second scheduling information, respectively.

In some examples, the SIB transmitting manager 830 may be configured as or otherwise support a means for transmitting, to the one or more UEs, a third SIB container including the third information. In some examples, the SIB transmitting manager 830 may be configured as or otherwise support a means for receiving the first SIB container via the first signaling, where transmitting the first SIB container includes relaying the first SIB container without decoding the first SIB container.

In some examples, the service message relaying manager 850 may be configured as or otherwise support a means for communicating a first service message between the one or more UEs and the first core network service based on transmitting the first SIB container. In some examples, the service message relaying manager 850 may be configured as or otherwise support a means for communicating a second service message between the one or more UEs and the second core network service based on transmitting the second SIB container.

In some examples, the SIB configuration manager 825 may be configured as or otherwise support a means for transmitting, to a DU, first signaling indicating a SIB configuration associated with the core network service, the SIB configuration including first information associated with communications with the core network service. In some examples, the SIB configuration manager 825 may be configured as or otherwise support a means for transmitting, to the DU based on the SIB configuration, an instruction for the DU to communicate the first information to one or more UEs via a first SIB container. The service message communicating manager 835 may be configured as or otherwise support a means for communicating a service message with a UE of the one or more UEs based on the instruction.

In some examples, the SIB configuration manager 825 may be configured as or otherwise support a means for transmitting, via the first signaling, a set of parameters associated with the SIB configuration, where the set of parameters includes scheduling information of the first SIB container, a size of the first SIB container, a quality of service metric for the first SIB container, a delivery delay for the first SIB container, a coverage area for the first SIB container, or any combination thereof.

In some examples, the control signaling manager 845 may be configured as or otherwise support a means for transmitting, via the first signaling, an indication that SIB containers associated with the SIB configuration are to be communicated on-demand in response to requests from the one or more UEs, where communicating the service message is based on the indication.

In some examples, the API manager 840 may be configured as or otherwise support a means for receiving, from the DU, a second core network service, or both, second signaling indicating API information associated with the DU, where the first signaling is transmitted in accordance with the API information.

In some examples, the SIB configuration further includes second information associated with communications with the core network service, and the SIB configuration manager 825 may be configured as or otherwise support a means for transmitting, to the DU, an instruction for the DU to communicate the second information to the one or more UEs via a second SIB container.

Figure 9:
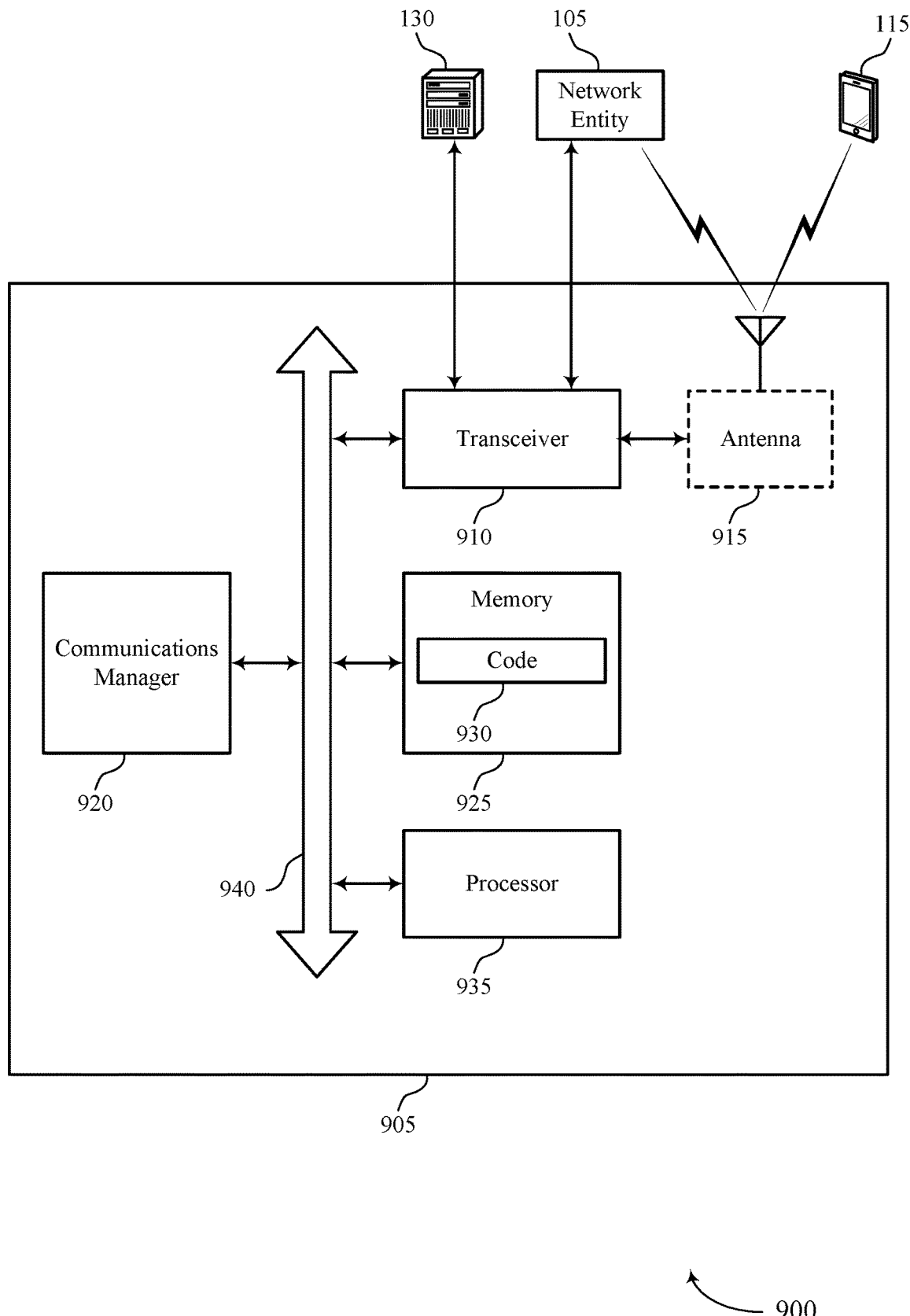
FIG. 9 shows a diagram of a system including a device that supports techniques for system information broadcast in a service-based wireless system in accordance with one or more aspects of the present disclosure.

FIG. 9 shows a diagram of a system 900 including a device 905 that supports techniques for system information broadcast in a service-based wireless system in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting techniques for system information broadcast in a service-based wireless system). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a service-based network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

For example, the communications manager 920 may be configured as or otherwise support a means for receiving, from a first core network service offered by a service-based network, first signaling indicating a first SIB configuration associated with the first core network service, the first SIB configuration including first information associated with communications with the first core network service. The communications manager 920 may be configured as or otherwise support a means for receiving, from a second core network service offered by the service-based network, second signaling indicating a second SIB configuration associated with the second core network service, the second SIB configuration including second information associated with communications with the second core network service. The communications manager 920 may be configured as or otherwise support a means for transmitting, to one or more UEs, a first SIB container including the first information. The communications manager 920 may be configured as or otherwise support a means for transmitting, to the one or more UEs, a second SIB container including the second information.

For example, the communications manager 920 may be configured as or otherwise support a means for transmitting, to a DU, first signaling indicating a SIB configuration associated with the core network service, the SIB configuration including first information associated with communications with the core network service. The communications manager 920 may be configured as or otherwise support a means for transmitting, to the DU based on the SIB configuration, an instruction for the DU to communicate the first information to one or more UEs via a first SIB container. The communications manager 920 may be configured as or otherwise support a means for communicating a service message with a UE of the one or more UEs based on the instruction.

By including or configuring the communications manager 920 in accordance with examples as described herein, the device 905 may support techniques that enable network entities 105 to broadcast system information to UEs 115 on behalf of core network services of the service-based network 130. Moreover, techniques described herein may enable network entities 105 to receive SIB containers from core network services, and relay the SIB containers to UEs 115 without decoding the respective SIB containers (e.g., transparent SIB containers). In this regard, aspects of the present disclosure may enable network entities 105 to efficiently aggregate system information from a multitude of core network services, and relay the system information to other wireless devices, thereby enabling the efficient communication of system information and facilitating more efficient and reliable wireless communications. Moreover, by enabling network entities 105 to relay SIB containers without decoding the SIB containers, techniques described herein may reduce processing requirements at the network entities 105, thereby reducing complexity and power consumption of the network.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of techniques for system information broadcast in a service-based wireless system as described herein, or the processor 935 and the memory 925 may be otherwise configured to perform or support such operations.

Figure 10:
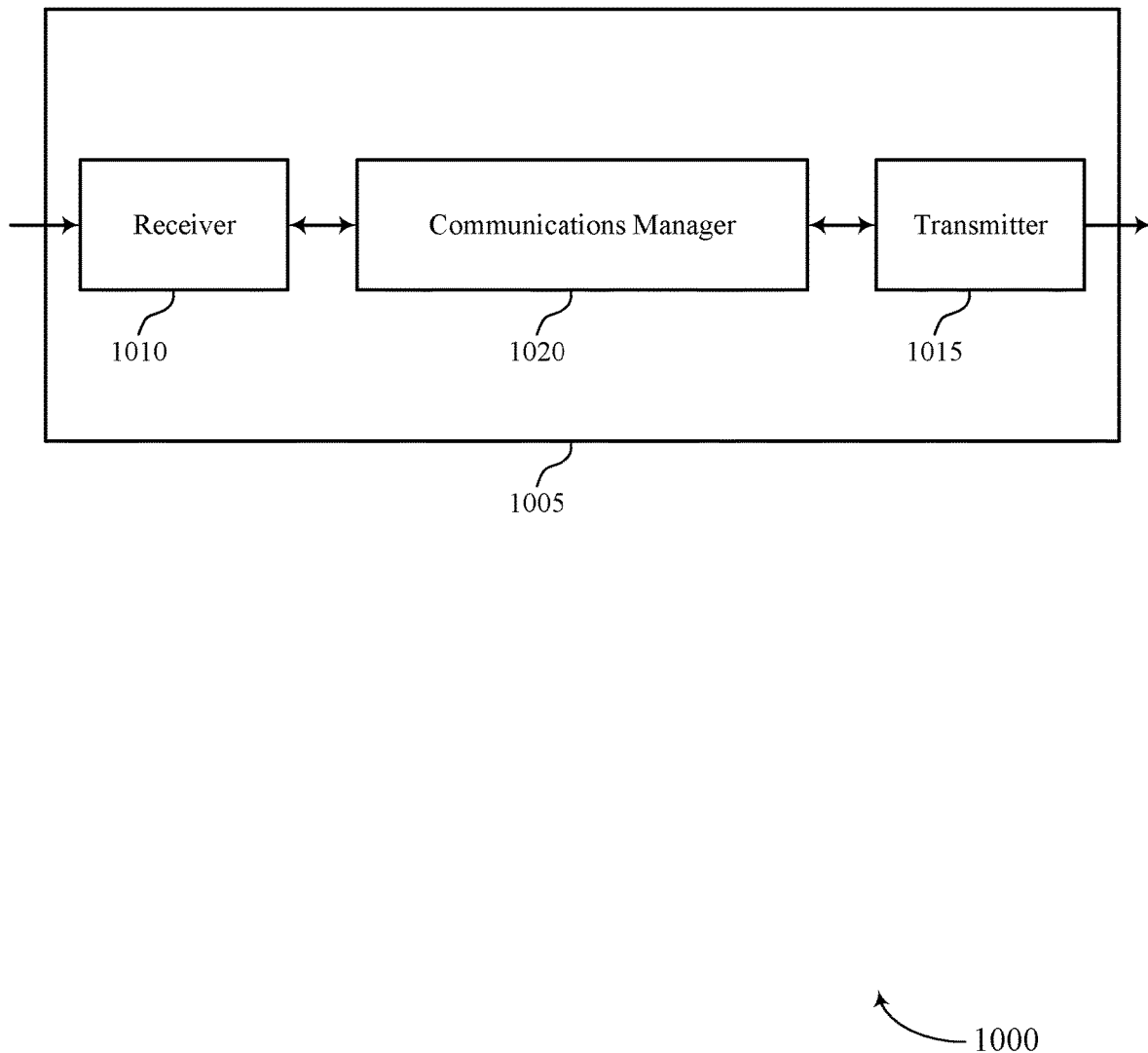
FIGS. 10 and 11 show block diagrams of devices that support techniques for system information broadcast in a service-based wireless system in accordance with one or more aspects of the present disclosure.

FIG. 10 shows a block diagram 1000 of a device 1005 that supports techniques for system information broadcast in a service-based wireless system in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for system information broadcast in a service-based wireless system). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for system information broadcast in a service-based wireless system). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for system information broadcast in a service-based wireless system as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 may be configured as or otherwise support a means for receiving, via a DU, a first SIB container including first information associated with communications with a first core network service offered by a service-based network. The communications manager 1020 may be configured as or otherwise support a means for receiving, via the DU, a second SIB container including second information associated with communications with a second core network service offered by the service-based network. The communications manager 1020 may be configured as or otherwise support a means for communicating, via the DU, a first service message with the first core network service based on the first SIB container. The communications manager 1020 may be configured as or otherwise support a means for communicating, via the DU, a second service message with the second core network service based on the second SIB container.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable network entities 105 to broadcast system information to UEs 115 on behalf of core network services of the service-based network 130. Moreover, techniques described herein may enable network entities 105 to receive SIB containers from core network services, and relay the SIB containers to UEs 115 without decoding the respective SIB containers (e.g., transparent SIB containers). In this regard, aspects of the present disclosure may enable network entities 105 to efficiently aggregate system information from a multitude of core network services, and relay the system information to other wireless devices, thereby enabling the efficient communication of system information and facilitating more efficient and reliable wireless communications. Moreover, by enabling network entities 105 to relay SIB containers without decoding the SIB containers, techniques described herein may reduce processing requirements at the network entities 105, thereby reducing complexity and power consumption of the network.

Figure 11:
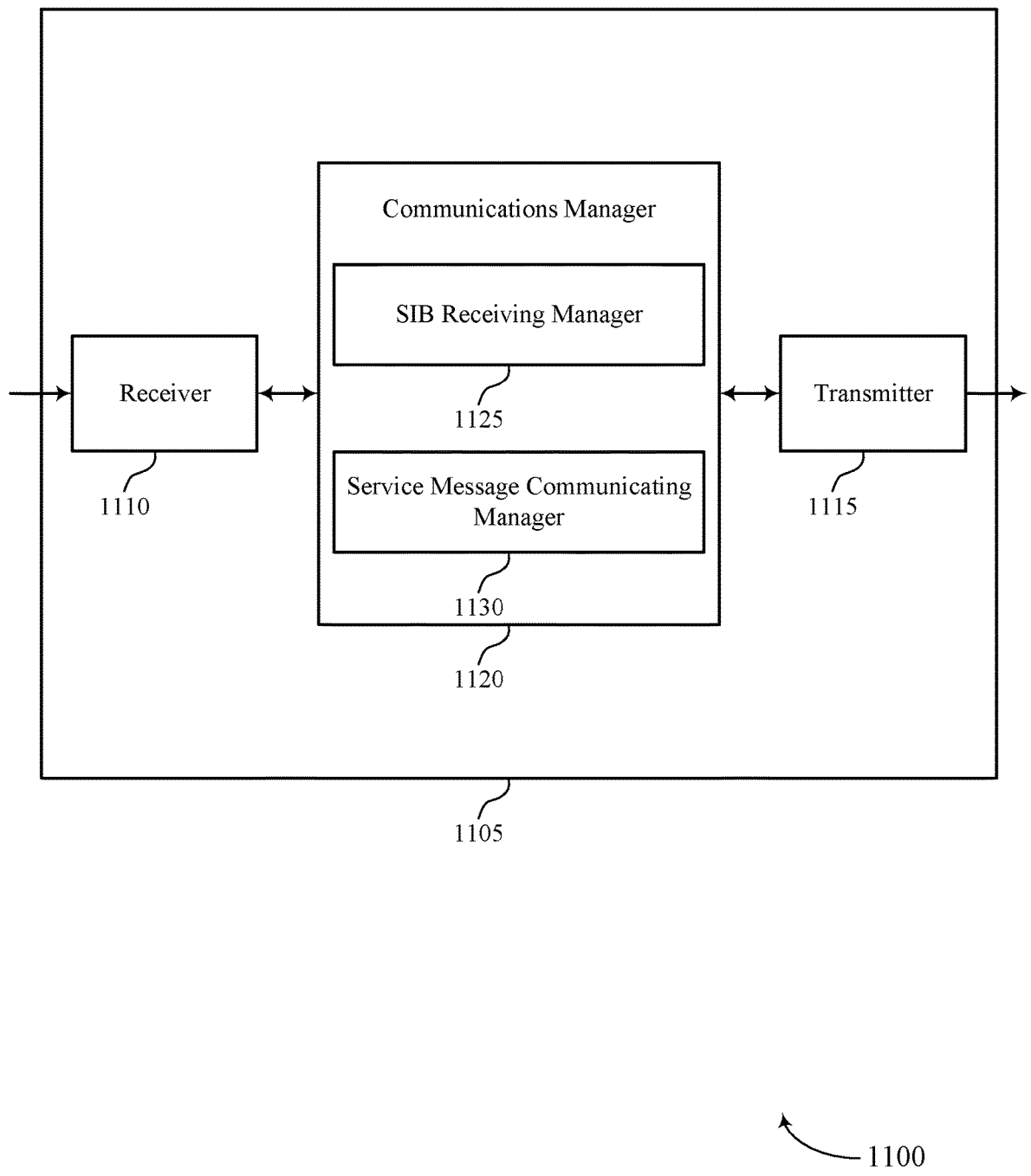

FIG. 11 shows a block diagram 1100 of a device 1105 that supports techniques for system information broadcast in a service-based wireless system in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for system information broadcast in a service-based wireless system). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for system information broadcast in a service-based wireless system). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for system information broadcast in a service-based wireless system as described herein. For example, the communications manager 1120 may include an SIB receiving manager 1125 a service message communicating manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The SIB receiving manager 1125 may be configured as or otherwise support a means for receiving, via a DU, a first SIB container including first information associated with communications with a first core network service offered by a service-based network. The SIB receiving manager 1125 may be configured as or otherwise support a means for receiving, via the DU, a second SIB container including second information associated with communications with a second core network service offered by the service-based network. The service message communicating manager 1130 may be configured as or otherwise support a means for communicating, via the DU, a first service message with the first core network service based on the first SIB container. The service message communicating manager 1130 may be configured as or otherwise support a means for communicating, via the DU, a second service message with the second core network service based on the second SIB container.

Figure 12:
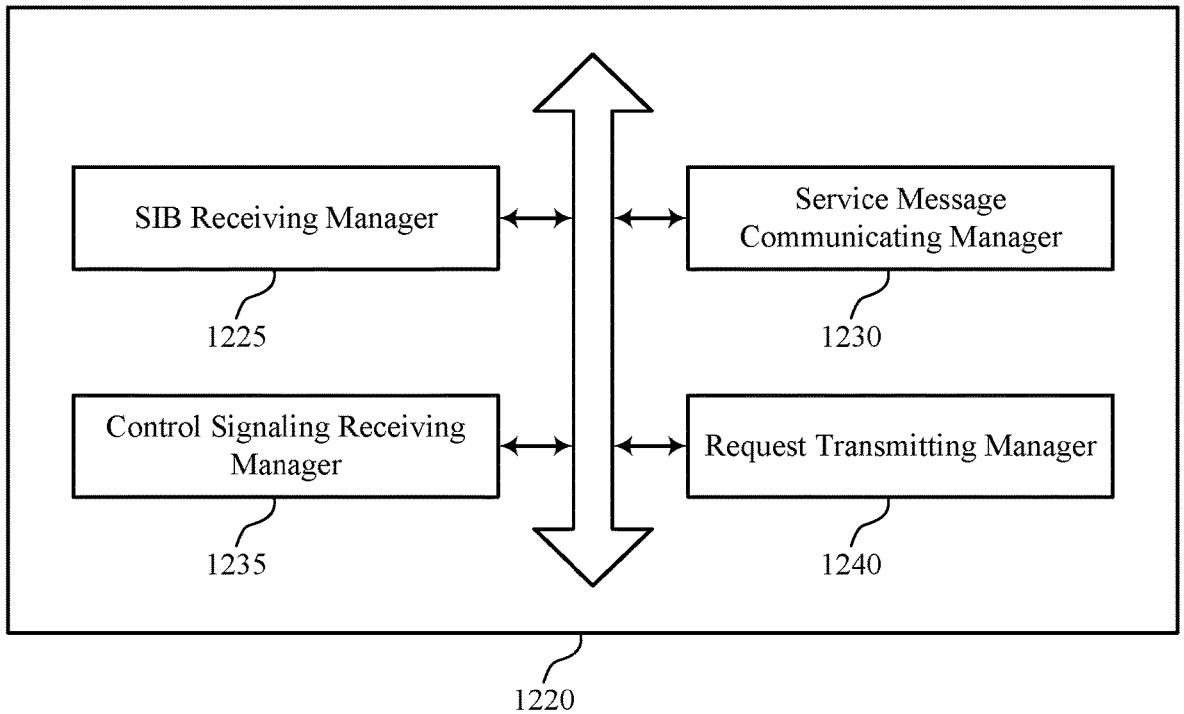
FIG. 12 shows a block diagram of a communications manager that supports techniques for system information broadcast in a service-based wireless system in accordance with one or more aspects of the present disclosure.

FIG. 12 shows a block diagram 1200 of a communications manager 1220 that supports techniques for system information broadcast in a service-based wireless system in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for system information broadcast in a service-based wireless system as described herein. For example, the communications manager 1220 may include an SIB receiving manager 1225, a service message communicating manager 1230, a control signaling receiving manager 1235, a request transmitting manager 1240, or any combination thereof. Each of these components may communicate, directly or indirectly, with one another (e.g., via one or more buses).

The SIB receiving manager 1225 may be configured as or otherwise support a means for receiving, via a DU, a first SIB container including first information associated with communications with a first core network service offered by a service-based network. In some examples, the SIB receiving manager 1225 may be configured as or otherwise support a means for receiving, via the DU, a second SIB container including second information associated with communications with a second core network service offered by the service-based network. The service message communicating manager 1230 may be configured as or otherwise support a means for communicating, via the DU, a first service message with the first core network service based on the first SIB container. In some examples, the service message communicating manager 1230 may be configured as or otherwise support a means for communicating, via the DU, a second service message with the second core network service based on the second SIB container.

In some examples, the control signaling receiving manager 1235 may be configured as or otherwise support a means for receiving, from the DU, an indication that SIB containers associated with the first core network service are to be provided on-demand in response to requests from the UE. In some examples, the request transmitting manager 1240 may be configured as or otherwise support a means for transmitting, to the DU, a request for the first SIB container based on receiving the indication, where the first SIB container is received in response to the request.

In some examples, the SIB receiving manager 1225 may be configured as or otherwise support a means for receiving, via the DU, a third SIB container including third information associated with communications with the first core network service, where communicating the first service message is based on receiving the third SIB container.

In some examples, the SIB receiving manager 1225 may be configured as or otherwise support a means for receiving, from the DU, a third SIB container including third information associated with communications between the DU and the UE, where communicating the first service message, the second service message, or both, is based on the third SIB container.

In some examples, the control signaling receiving manager 1235 may be configured as or otherwise support a means for receiving, from the DU, third signaling indicating first scheduling information associated with the first SIB container and second scheduling information associated with the second SIB container. In some examples, the SIB receiving manager 1225 may be configured as or otherwise support a means for monitoring for the first SIB container and the second SIB container in accordance with the first scheduling information and the second scheduling information, respectively, where receiving the first SIB container and the second SIB container is based on the monitoring.

Figure 13:
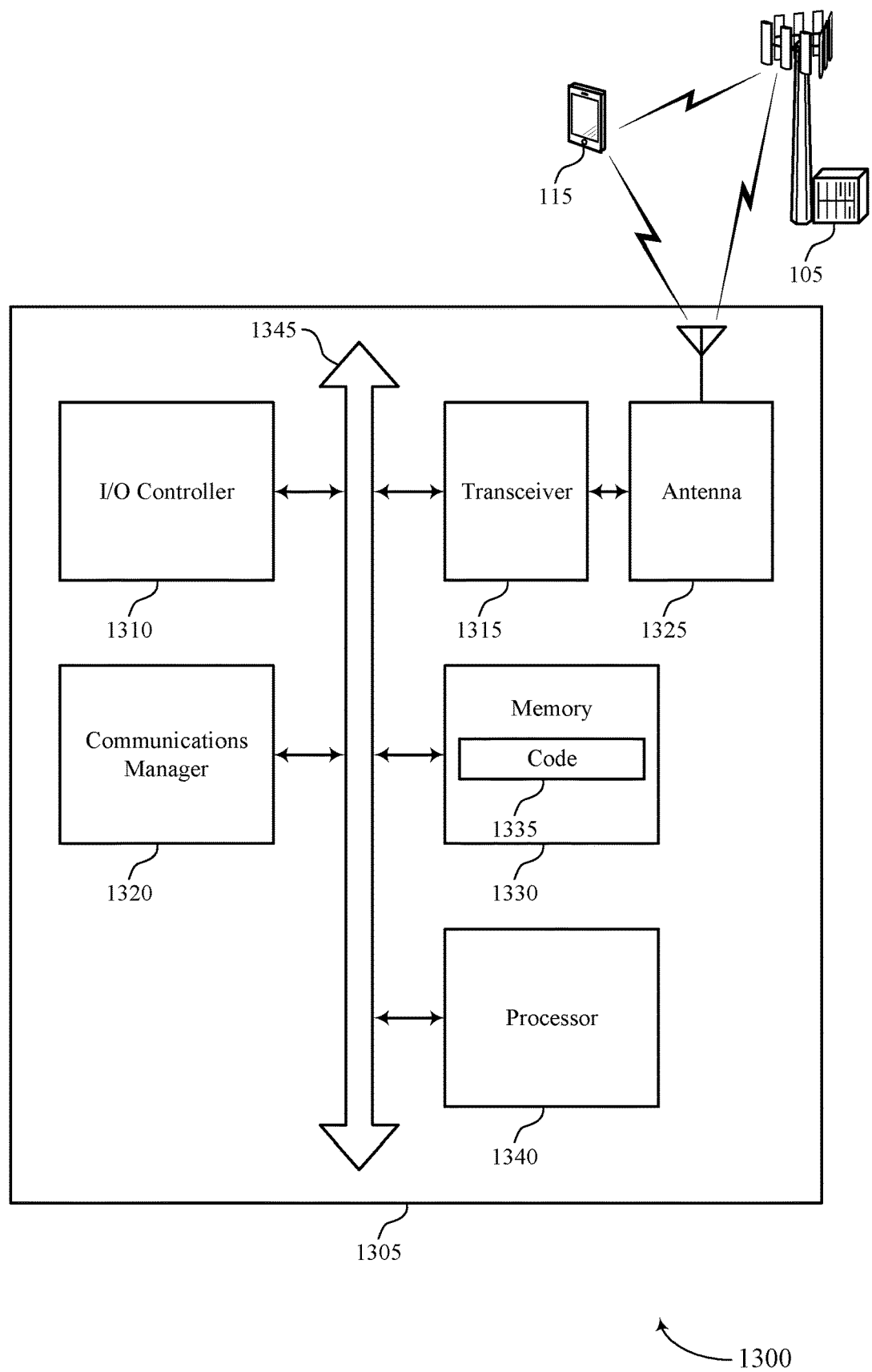
FIG. 13 shows a diagram of a system including a device that supports techniques for system information broadcast in a service-based wireless system in accordance with one or more aspects of the present disclosure.

FIG. 13 shows a diagram of a system 1300 including a device 1305 that supports techniques for system information broadcast in a service-based wireless system in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for system information broadcast in a service-based wireless system). For example, the device 1305 or a component of the device 1305 may include a processor 1340 and memory 1330 coupled with or to the processor 1340, the processor 1340 and memory 1330 configured to perform various functions described herein.

For example, the communications manager 1320 may be configured as or otherwise support a means for receiving, via a DU, a first SIB container including first information associated with communications with a first core network service offered by a service-based network. The communications manager 1320 may be configured as or otherwise support a means for receiving, via the DU, a second SIB container including second information associated with communications with a second core network service offered by the service-based network. The communications manager 1320 may be configured as or otherwise support a means for communicating, via the DU, a first service message with the first core network service based on the first SIB container. The communications manager 1320 may be configured as or otherwise support a means for communicating, via the DU, a second service message with the second core network service based on the second SIB container.

By including or configuring the communications manager 1320 in accordance with examples as described herein, the device 1305 may support techniques that enable network entities 105 to broadcast system information to UEs 115 on behalf of core network services of the service-based network 130. Moreover, techniques described herein may enable network entities 105 to receive SIB containers from core network services, and relay the SIB containers to UEs 115 without decoding the respective SIB containers (e.g., transparent SIB containers). In this regard, aspects of the present disclosure may enable network entities 105 to efficiently aggregate system information from a multitude of core network services, and relay the system information to other wireless devices, thereby enabling the efficient communication of system information and facilitating more efficient and reliable wireless communications. Moreover, by enabling network entities 105 to relay SIB containers without decoding the SIB containers, techniques described herein may reduce processing requirements at the network entities 105, thereby reducing complexity and power consumption of the network.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for system information broadcast in a service-based wireless system as described herein, or the processor 1340 and the memory 1330 may be otherwise configured to perform or support such operations.

Figure 14:
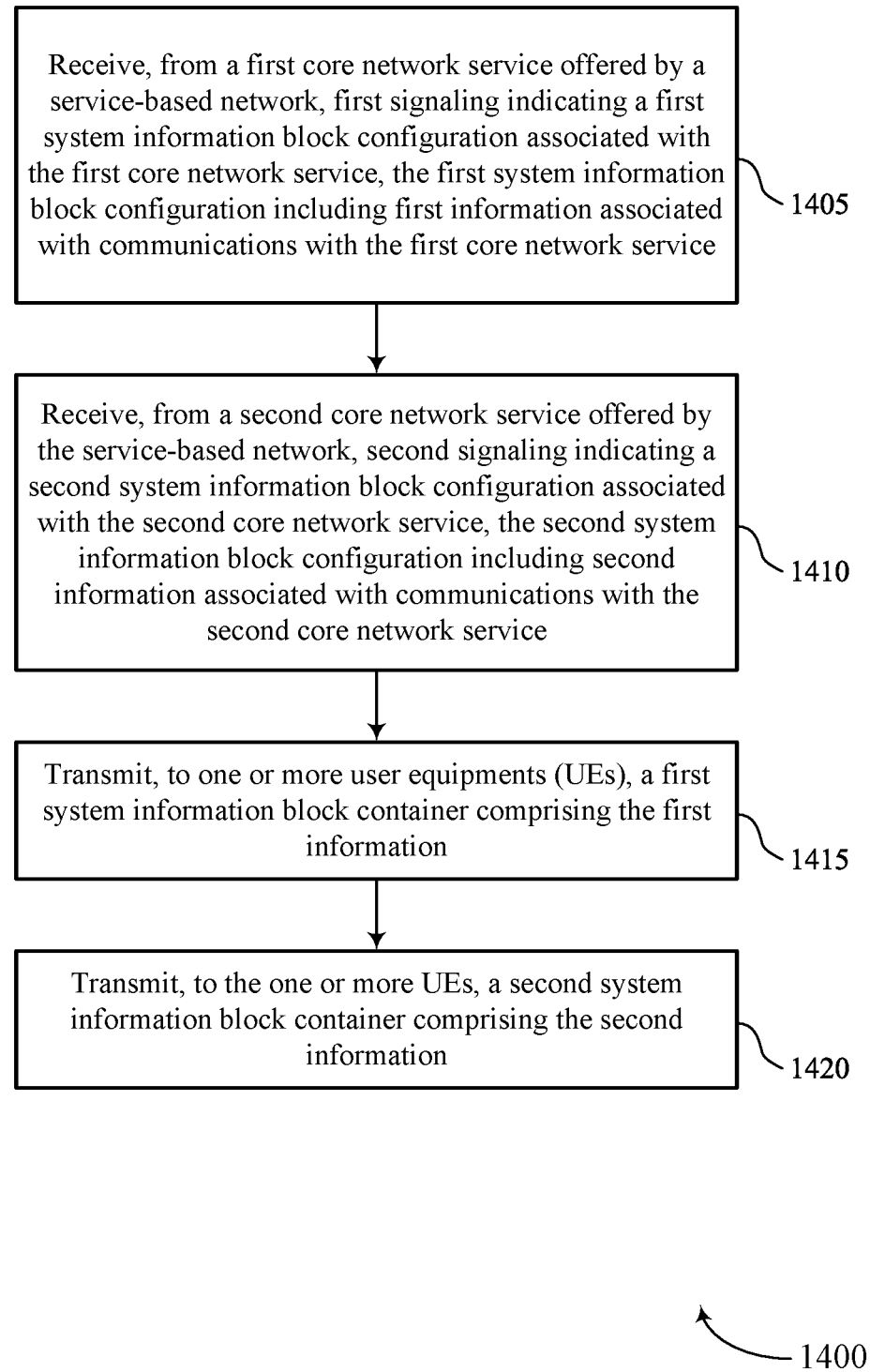
FIGS. 14 through 17 show flowcharts illustrating methods that support techniques for system information broadcast in a service-based wireless system in accordance with one or more aspects of the present disclosure.

FIG. 14 shows a flowchart illustrating a method 1400 that supports techniques for system information broadcast in a service-based wireless system in accordance with one or more aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a first core network service offered by a service-based network, first signaling indicating a first SIB configuration associated with the first core network service, the first SIB configuration including first information associated with communications with the first core network service. The operations of 1405 may be performed in accordance with examples as disclosed herein. In some examples, aspects of the operations of 1405 may be performed by an SIB configuration manager 825 as described with reference to FIG. 8.

At 1410, the method may include receiving, from a second core network service offered by the service-based network, second signaling indicating a second SIB configuration associated with the second core network service, the second SIB configuration including second information associated with communications with the second core network service. The operations of 1410 may be performed in accordance with examples as disclosed herein. In some examples, aspects of the operations of 1410 may be performed by an SIB configuration manager 825 as described with reference to FIG. 8.

At 1415, the method may include transmitting, to one or more UEs, a first SIB container including the first information. The operations of 1415 may be performed in accordance with examples as disclosed herein. In some examples, aspects of the operations of 1415 may be performed by an SIB transmitting manager 830 as described with reference to FIG. 8.

At 1420, the method may include transmitting, to the one or more UEs, a second SIB container including the second information. The operations of 1420 may be performed in accordance with examples as disclosed herein. In some examples, aspects of the operations of 1420 may be performed by an SIB transmitting manager 830 as described with reference to FIG. 8.

Figure 15:
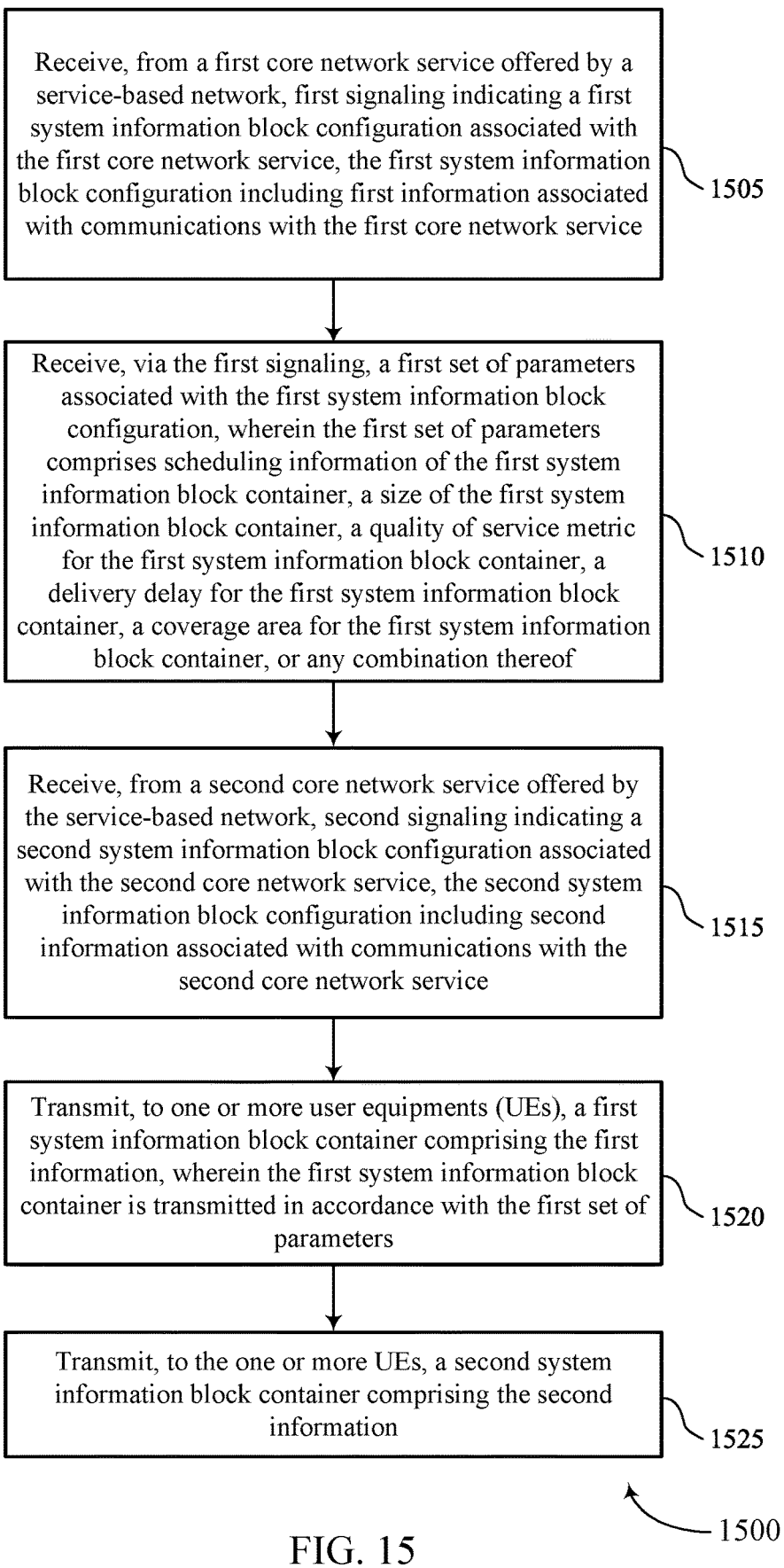

FIG. 15 shows a flowchart illustrating a method 1500 that supports techniques for system information broadcast in a service-based wireless system in accordance with one or more aspects of the present disclosure. The operations of the method 1500 may be implemented by a network entity or its components as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a first core network service offered by a service-based network, first signaling indicating a first SIB configuration associated with the first core network service, the first SIB configuration including first information associated with communications with the first core network service. The operations of 1505 may be performed in accordance with examples as disclosed herein. In some examples, aspects of the operations of 1505 may be performed by an SIB configuration manager 825 as described with reference to FIG. 8.

At 1510, the method may include receiving, via the first signaling, a first set of parameters associated with the first SIB configuration, where the first set of parameters includes scheduling information of the first SIB container, a size of the first SIB container, a quality of service metric for the first SIB container, a delivery delay for the first SIB container, a coverage area for the first SIB container, or any combination thereof. The operations of 1510 may be performed in accordance with examples as disclosed herein. In some examples, aspects of the operations of 1510 may be performed by an SIB configuration manager 825 as described with reference to FIG. 8.

At 1515, the method may include receiving, from a second core network service offered by the service-based network, second signaling indicating a second SIB configuration associated with the second core network service, the second SIB configuration including second information associated with communications with the second core network service. The operations of 1515 may be performed in accordance with examples as disclosed herein. In some examples, aspects of the operations of 1515 may be performed by an SIB configuration manager 825 as described with reference to FIG. 8.

At 1520, the method may include transmitting, to one or more UEs, a first SIB container including the first information, where the first SIB container is transmitted in accordance with the first set of parameters. The operations of 1520 may be performed in accordance with examples as disclosed herein. In some examples, aspects of the operations of 1520 may be performed by an SIB transmitting manager 830 as described with reference to FIG. 8.

At 1525, the method may include transmitting, to the one or more UEs, a second SIB container including the second information. The operations of 1525 may be performed in accordance with examples as disclosed herein. In some examples, aspects of the operations of 1525 may be performed by an SIB transmitting manager 830 as described with reference to FIG. 8.

Figure 16:
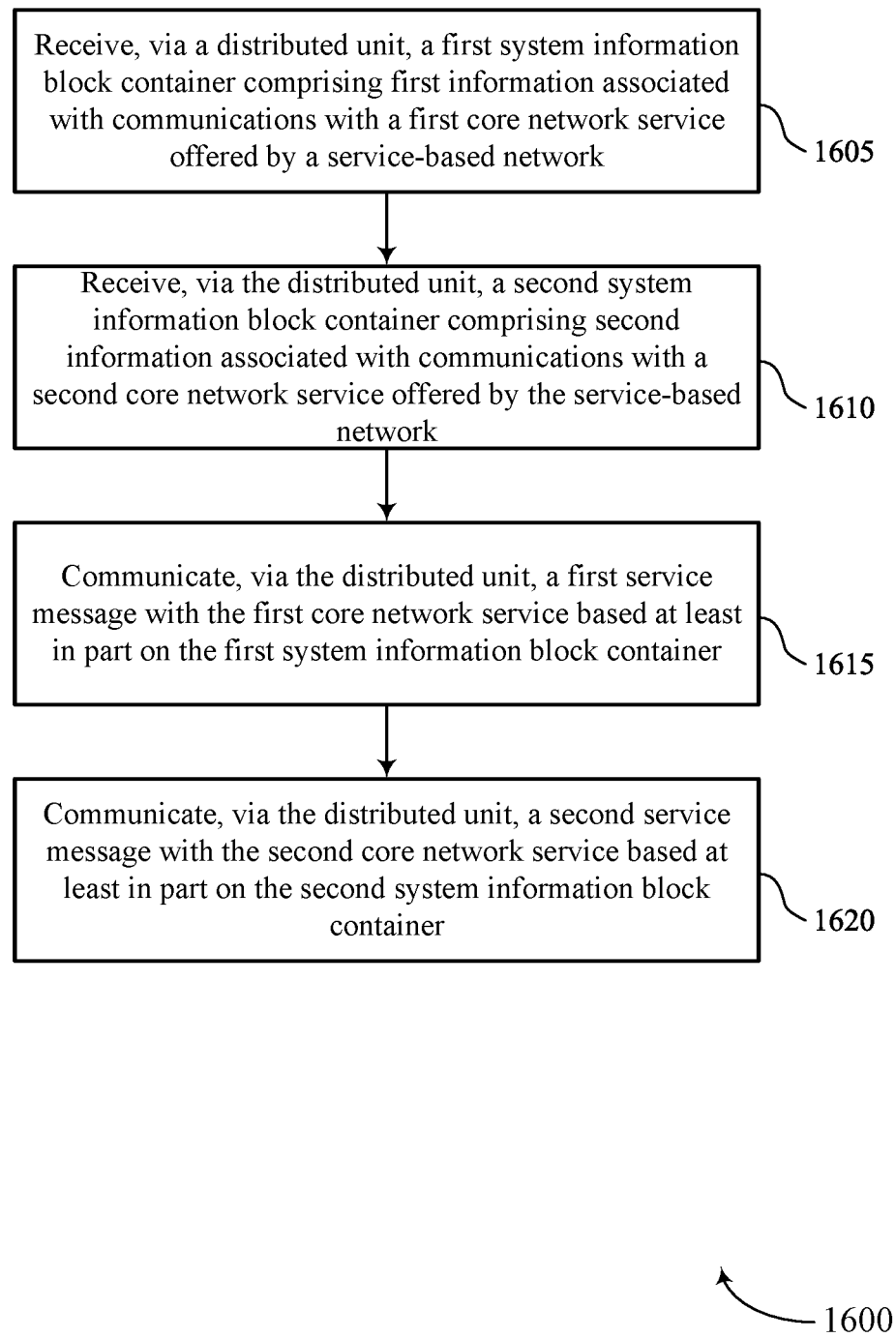

FIG. 16 shows a flowchart illustrating a method 1600 that supports techniques for system information broadcast in a service-based wireless system in accordance with one or more aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1605, the method may include receiving, via a DU, a first SIB container including first information associated with communications with a first core network service offered by a service-based network. The operations of 1605 may be performed in accordance with examples as disclosed herein. In some examples, aspects of the operations of 1605 may be performed by an SIB receiving manager 1225 as described with reference to FIG. 12.

At 1610, the method may include receiving, via the DU, a second SIB container including second information associated with communications with a second core network service offered by the service-based network. The operations of 1610 may be performed in accordance with examples as disclosed herein. In some examples, aspects of the operations of 1610 may be performed by an SIB receiving manager 1225 as described with reference to FIG. 12.

At 1615, the method may include communicating, via the DU, a first service message with the first core network service based on the first SIB container. The operations of 1615 may be performed in accordance with examples as disclosed herein. In some examples, aspects of the operations of 1615 may be performed by a service message communicating manager 1230 as described with reference to FIG. 12.

At 1620, the method may include communicating, via the DU, a second service message with the second core network service based on the second SIB container. The operations of 1620 may be performed in accordance with examples as disclosed herein. In some examples, aspects of the operations of 1620 may be performed by a service message communicating manager 1230 as described with reference to FIG. 12.

Figure 17:
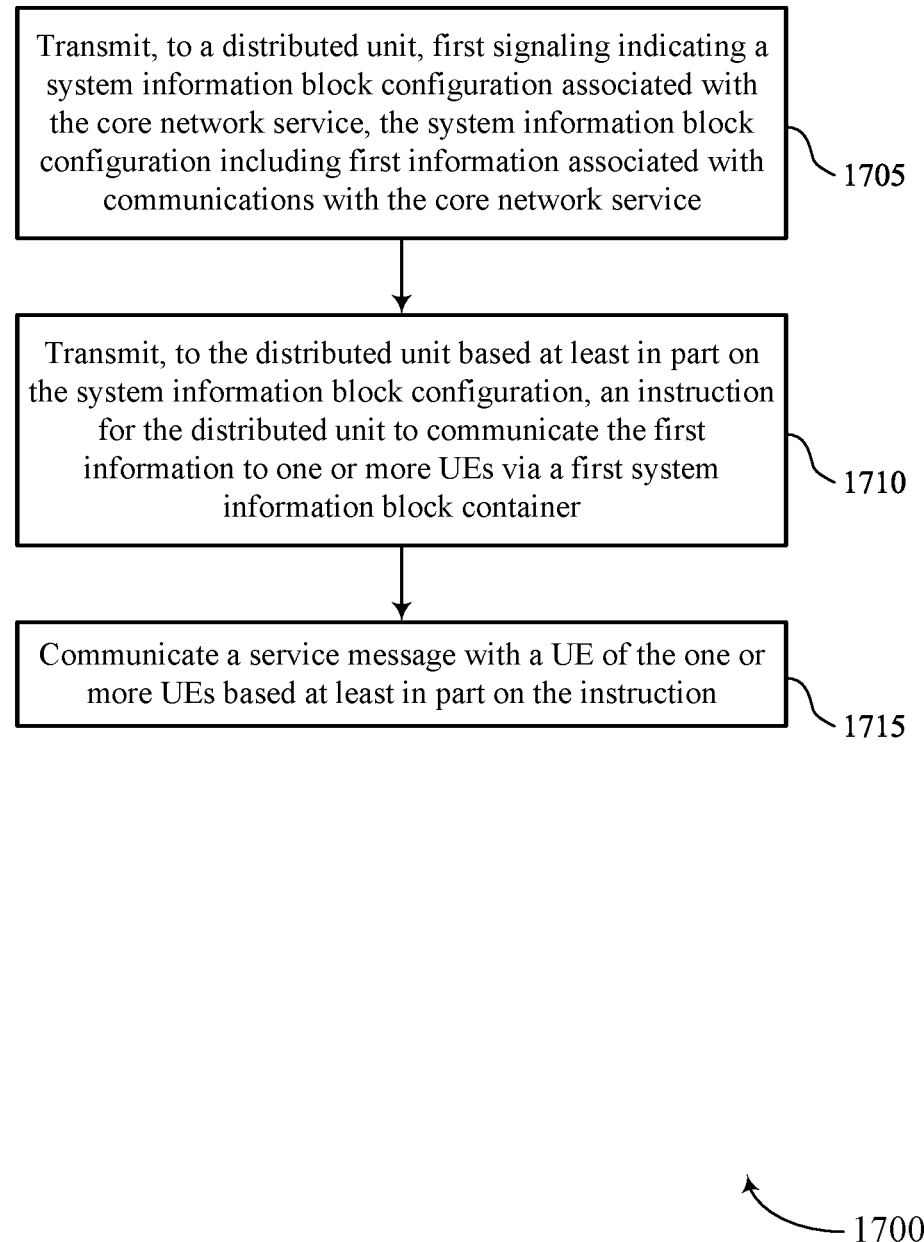

FIG. 17 shows a flowchart illustrating a method 1700 that supports techniques for system information broadcast in a service-based wireless system in accordance with one or more aspects of the present disclosure. The operations of the method 1700 may be implemented by a network entity or its components as described herein. For example, the operations of the method 1700 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a DU, first signaling indicating a SIB configuration associated with the core network service, the SIB configuration including first information associated with communications with the core network service. The operations of 1705 may be performed in accordance with examples as disclosed herein. In some examples, aspects of the operations of 1705 may be performed by an SIB configuration manager 825 as described with reference to FIG. 8.

At 1710, the method may include transmitting, to the DU based on the SIB configuration, an instruction for the DU to communicate the first information to one or more UEs via a first SIB container. The operations of 1710 may be performed in accordance with examples as disclosed herein. In some examples, aspects of the operations of 1710 may be performed by an SIB configuration manager 825 as described with reference to FIG. 8.

At 1715, the method may include communicating a service message with a UE of the one or more UEs based on the instruction. The operations of 1715 may be performed in accordance with examples as disclosed herein. In some examples, aspects of the operations of 1715 may be performed by a service message communicating manager 835 as described with reference to FIG. 8.

The following provides an overview of aspects of the present disclosure:

Aspect 1: A method for wireless communication at a DU, comprising: receiving, from a first core network service offered by a service-based network, first signaling indicating a first SIB configuration associated with the first core network service, the first SIB configuration including first information associated with communications with the first core network service; receiving, from a second core network service offered by the service-based network, second signaling indicating a second SIB configuration associated with the second core network service, the second SIB configuration including second information associated with communications with the second core network service; transmitting, to one or more UEs, a first SIB container comprising the first information; and transmitting, to the one or more UEs, a second SIB container comprising the second information.

Aspect 2: The method of aspect 1, wherein the first signaling, the second signaling, or both, is received in accordance with API information associated with the DU.

Aspect 3: The method of any of aspects 1 through 2, further comprising: receiving, via the first signaling, a first set of parameters associated with the first SIB configuration, wherein the first set of parameters comprises scheduling information of the first SIB container, a size of the first SIB container, a QoS metric for the first SIB container, a delivery delay for the first SIB container, a coverage area for the first SIB container, or any combination thereof, wherein the first SIB container is transmitted in accordance with the first set of parameters.

Aspect 4: The method of any of aspects 1 through 3, further comprising: receiving, via the first signaling, an indication that SIB containers associated with the first SIB configuration are to be provided on-demand in response to requests from the one or more UEs, wherein transmitting the first SIB container is based at least in part on the indication.

Aspect 5: The method of aspect 4, further comprising: transmitting, to the one or more UEs, the indication that SIB containers associated with the first SIB configuration are to be provided on-demand in response to requests from the one or more UEs; and receiving, from a UE of the one or more UEs, a request for the first SIB container based at least in part on transmitting the indication, wherein the first SIB container is transmitted to the UE in response to the request.

Aspect 6: The method of any of aspects 1 through 5, further comprising: transmitting, to the one or more UEs, a third SIB container comprising third information associated with communications between the DU and the one or more UEs.

Aspect 7: The method of any of aspects 1 through 6, further comprising: transmitting, the first core network service, the second core network service, an additional core network service, or any combination thereof, third signaling indicating API information associated with the DU, wherein the first signaling, the second signaling, or both, are received in accordance with the application programming interrace information.

Aspect 8: The method of any of aspects 1 through 7, further comprising: transmitting, to the one or more UEs, third signaling indicating first scheduling information associated with the first SIB container and second scheduling information associated with the second SIB container, wherein the first SIB container and the second SIB container are transmitted in accordance with the first scheduling information and the second scheduling information, respectively.

Aspect 9: The method of any of aspects 1 through 8, wherein the first SIB configuration further comprises third information associated with communications with the first core network service, the method further comprising: transmitting, to the one or more UEs, a third SIB container comprising the third information.

Aspect 10: The method of any of aspects 1 through 9, further comprising: receiving the first SIB container via the first signaling, wherein transmitting the first SIB container comprises relaying the first SIB container without decoding the first SIB container.

Aspect 11: The method of any of aspects 1 through 10, further comprising: communicating a first service message between the one or more UEs and the first core network service based at least in part on transmitting the first SIB container; and communicating a second service message between the one or more UEs and the second core network service based at least in part on transmitting the second SIB container.

Aspect 12: A method for wireless communication at a UE, comprising: receiving, via a DU, a first SIB container comprising first information associated with communications with a first core network service offered by a service-based network; receiving, via the DU, a second SIB container comprising second information associated with communications with a second core network service offered by the service-based network; communicating, via the DU, a first service message with the first core network service based at least in part on the first SIB container; and communicating, via the DU, a second service message with the second core network service based at least in part on the second SIB container.

Aspect 13: The method of aspect 12, wherein the first signaling, the second signaling, or both, is received in accordance with API information associated with the DU.

Aspect 14: The method of any of aspects 12 through 13, further comprising: receiving, from the DU, an indication that SIB containers associated with the first core network service are to be provided on-demand in response to requests from the UE; and transmitting, to the DU, a request for the first SIB container based at least in part on receiving the indication, wherein the first SIB container is received in response to the request.

Aspect 15: The method of any of aspects 12 through 14, further comprising: receiving, via the DU, a third SIB container comprising third information associated with communications with the first core network service, wherein communicating the first service message is based at least in part on receiving the third SIB container.

Aspect 16: The method of any of aspects 12 through 15, further comprising: receiving, from the DU, a third SIB container comprising third information associated with communications between the DU and the UE, wherein communicating the first service message, the second service message, or both, is based at least in part on the third SIB container.

Aspect 17: The method of any of aspects 12 through 16, further comprising: receiving, from the DU, third signaling indicating first scheduling information associated with the first SIB container and second scheduling information associated with the second SIB container; and monitoring for the first SIB container and the second SIB container in accordance with the first scheduling information and the second scheduling information, respectively, wherein receiving the first SIB container and the second SIB container is based at least in part on the monitoring.

Aspect 18: A method for wireless communication at a core network service offered by a service-based network, comprising: transmitting, to a DU, first signaling indicating a SIB configuration associated with the core network service, the SIB configuration including first information associated with communications with the core network service; transmitting, to the DU based at least in part on the SIB configuration, an instruction for the DU to communicate the first information to one or more UEs via a first SIB container; and communicating a service message with a UE of the one or more UEs based at least in part on the instruction.

Aspect 19: The method of aspect 18, the first signaling, the second signaling, or both, is transmitted in accordance with API information associated with the DU.

Aspect 20: The method of any of aspects 18 through 19, further comprising: transmitting, via the first signaling, a set of parameters associated with the SIB configuration, wherein the set of parameters comprises scheduling information of the first information block container, a size of the first SIB container, a QoS metric for the first SIB container, a delivery delay for the first SIB container, a coverage area for the first SIB container, or any combination thereof.

Aspect 21: The method of any of aspects 18 through 20, further comprising: transmitting, via the first signaling, an indication that SIB containers associated with the SIB configuration are to be communicated on-demand in response to requests from the one or more UEs, wherein communicating the service message is based at least in part on the indication.

Aspect 22: The method of any of aspects 18 through 21, further comprising: receiving API information associated with the DU, wherein transmitting the first signaling to the DU, transmitting the instruction to the DU, or both, is based at least in part on the API information.

Aspect 23: The method of any of aspects 18 through 22, further comprising: receiving, from the DU, a second core network service, or both, second signaling indicating API information associated with the DU, wherein the first signaling is transmitted in accordance with the application programming interrace information.

Aspect 24: The method of any of aspects 18 through 23, wherein the SIB configuration further comprises second information associated with communications with the core network service, the method further comprising: transmitting, to the DU, an instruction for the DU to communicate the second information to the one or more UEs via a second SIB container.

Aspect 25: An apparatus comprising a processor; memory coupled with the processor; and instructions stored in the memory and executable by the processor to cause the apparatus to perform a method of any of aspects 1 through 11.

Aspect 26: An apparatus comprising at least one means for performing a method of any of aspects 1 through 11.

Aspect 27: A non-transitory computer-readable medium storing code the code comprising instructions executable by a processor to perform a method of any of aspects 1 through 11.

Aspect 28: An apparatus comprising a processor; memory coupled with the processor; and instructions stored in the memory and executable by the processor to cause the apparatus to perform a method of any of aspects 12 through 17.

Aspect 29: An apparatus comprising at least one means for performing a method of any of aspects 12 through 17.

Aspect 30: A non-transitory computer-readable medium storing code the code comprising instructions executable by a processor to perform a method of any of aspects 12 through 17.

Aspect 31: An apparatus comprising a processor; memory coupled with the processor; and instructions stored in the memory and executable by the processor to cause the apparatus to perform a method of any of aspects 18 through 24.

Aspect 32: An apparatus comprising at least one means for performing a method of any of aspects 18 through 24.

Aspect 33: A non-transitory computer-readable medium storing code the code comprising instructions executable by a processor to perform a method of any of aspects 18 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a distributed unit, comprising:
   receiving, from a first core network service offered by a service-based network, first signaling indicating a first system information block configuration associated with the first core network service, the first system information block configuration including first information associated with communications with the first core network service;
   receiving, from a second core network service offered by the service-based network, second signaling indicating a second system information block configuration associated with the second core network service, the second system information block configuration including second information associated with communications with the second core network service;
   transmitting, to one or more user equipments (UEs), a first system information block container comprising the first information; and
   transmitting, to the one or more UEs, a second system information block container comprising the second information.

2. The method of claim 1, wherein the first signaling, the second signaling, or both, is received in accordance with application programming interface information associated with the distributed unit.

3. The method of claim 1, further comprising:
   receiving, via the first signaling, a first set of parameters associated with the first system information block configuration, wherein the first set of parameters comprises scheduling information of the first system information block container, a size of the first system information block container, a quality of service metric for the first system information block container, a delivery delay for the first system information block container, a coverage area for the first system information block container, or any combination thereof, wherein the first system information block container is transmitted in accordance with the first set of parameters.

4. The method of claim 1, further comprising:
   receiving, via the first signaling, an indication that system information block containers associated with the first system information block configuration are to be provided on-demand in response to requests from the one or more UEs, wherein transmitting the first system information block container is based at least in part on the indication.

5. The method of claim 4, further comprising:
   transmitting, to the one or more UEs, the indication that system information block containers associated with the first system information block configuration are to be provided on-demand in response to requests from the one or more UEs; and
   receiving, from a UE of the one or more UEs, a request for the first system information block container based at least in part on transmitting the indication, wherein the first system information block container is transmitted to the UE in response to the request.

6. The method of claim 1, further comprising:
   transmitting, to the one or more UEs, a third system information block container comprising third information associated with communications between the distributed unit and the one or more UEs.

7. The method of claim 1, further comprising:
   transmitting, to the first core network service, the second core network service, an additional core network service, or any combination thereof, third signaling indicating application programming interface information associated with the distributed unit, wherein the first signaling, the second signaling, or both, are received in accordance with the application programming interface information.

8. The method of claim 1, further comprising:
   transmitting, to the one or more user equipments, third signaling indicating first scheduling information associated with the first system information block container and second scheduling information associated with the second system information block container, wherein the first system information block container and the second system information block container are transmitted in accordance with the first scheduling information and the second scheduling information, respectively.

9. The method of claim 1, wherein the first system information block configuration further comprises third information associated with communications with the first core network service, the method further comprising:
   transmitting, to the one or more UEs, a third system information block container comprising the third information.

10. The method of claim 1, further comprising:
    receiving the first system information block container via the first signaling, wherein transmitting the first system information block container comprises relaying the first system information block container without decoding the first system information block container.

11. The method of claim 1, further comprising:
    communicating a first service message between the one or more UEs and the first core network service based at least in part on transmitting the first system information block container; and
    communicating a second service message between the one or more UEs and the second core network service based at least in part on transmitting the second system information block container.

12. A method for wireless communication at a user equipment (UE), comprising:
receiving, via a distributed unit, a first system information block container comprising first information associated with communications with a first core network service offered by a service-based network;
receiving, via the distributed unit, a second system information block container comprising second information associated with communications with a second core network service offered by the service-based network;
communicating, via the distributed unit, a first service message with the first core network service based at least in part on the first system information block container; and
communicating, via the distributed unit, a second service message with the second core network service based at least in part on the second system information block container.

13. The method of claim 12, wherein the first service message, the second service message, or both, are communicated in accordance with application programming interface information associated with the distributed unit.

14. The method of claim 12, further comprising:
receiving, from the distributed unit, an indication that system information block containers associated with the first core network service are to be provided on-demand in response to requests from the UE; and
transmitting, to the distributed unit, a request for the first system information block container based at least in part on receiving the indication, wherein the first system information block container is received in response to the request.

15. The method of claim 12, further comprising:
receiving, via the distributed unit, a third system information block container comprising third information associated with communications with the first core network service, wherein communicating the first service message is based at least in part on receiving the third system information block container.

16. The method of claim 12, further comprising:
receiving, from the distributed unit, a third system information block container comprising third information associated with communications between the distributed unit and the UE, wherein communicating the first service message, the second service message, or both, is based at least in part on the third system information block container.

17. The method of claim 12, further comprising:
receiving, from the distributed unit, third signaling indicating first scheduling information associated with the first system information block container and second scheduling information associated with the second system information block container; and
monitoring for the first system information block container and the second system information block container in accordance with the first scheduling information and the second scheduling information, respectively, wherein receiving the first system information block container and the second system information block container is based at least in part on the monitoring.

18. A method for wireless communication at a core network service offered by a service-based network, comprising:
transmitting, to a distributed unit, first signaling indicating a system information block configuration associated with the core network service, the system information block configuration including first information associated with communications with the core network service;
transmitting, to the distributed unit based at least in part on the system information block configuration, an instruction for the distributed unit to communicate the first information to one or more UEs via a first system information block container; and
communicating a service message with a UE of the one or more UEs based at least in part on the instruction.

19. The method of claim 18, wherein the first signaling, the instruction, or both, is transmitted in accordance with application programming interface information associated with the distributed unit.

20. The method of claim 18, further comprising:
transmitting, via the first signaling, a set of parameters associated with the system information block configuration, wherein the set of parameters comprises scheduling information of the first information block container, a size of the first system information block container, a quality of service metric for the first system information block container, a delivery delay for the first system information block container, a coverage area for the first system information block container, or any combination thereof.

21. The method of claim 18, further comprising:
transmitting, via the first signaling, an indication that system information block containers associated with the system information block configuration are to be communicated on-demand in response to requests from the one or more UEs, wherein communicating the service message is based at least in part on the indication.

22. The method of claim 18, further comprising:
receiving, from the distributed unit, a second core network service, or both, second signaling indicating application programming interface information associated with the distributed unit, wherein the first signaling is transmitted in accordance with the application programming interface information.

23. The method of claim 18, further comprising:
receiving application programming interface information associated with the distributed unit, wherein transmitting the first signaling to the distributed unit, transmitting the instruction to the distributed unit, or both, is based at least in part on the application programming interface information.

24. The method of claim 18, wherein the system information block configuration further comprises second information associated with communications with the core network service, the method further comprising:
transmitting, to the distributed unit, an instruction for the distributed unit to communicate the second information to the one or more UEs via a second system information block container.

25. An apparatus for wireless communication at a user equipment (UE), comprising:
a processor;
memory coupled with the processor; and
instructions stored in the memory and executable by the processor to cause the apparatus to:
receive, via a distributed unit, a first system information block container comprising first information associated with communications with a first core network service offered by a service-based network;

receive, via the distributed unit, a second system information block container comprising second information associated with communications with a second core network service offered by the service-based network;

communicate, via the distributed unit, a first service message with the first core network service based at least in part on the first system information block container; and communicate, via the distributed unit, a second service message with the second core network service based at least in part on the second system information block container.

26. The apparatus of claim 25, wherein the first service message, the second service message, or both, are communicated in accordance with application programming interface information associated with the distributed unit.

27. The apparatus of claim 25, wherein the instructions are further executable by the processor to cause the apparatus to:

receive, from the distributed unit, an indication that system information block containers associated with the first core network service are to be provided on-demand in response to requests from the UE; and transmit, to the distributed unit, a request for the first system information block container based at least in part on receiving the indication, wherein the first system information block container is received in response to the request.

28. The apparatus of claim 25, wherein the instructions are further executable by the processor to cause the apparatus to:

receive, via the distributed unit, a third system information block container comprising third information associated with communications with the first core network service, wherein communicating the first service message is based at least in part on receiving the third system information block container.

29. The apparatus of claim 25, wherein the instructions are further executable by the processor to cause the apparatus to:

receive, from the distributed unit, a third system information block container comprising third information associated with communications between the distributed unit and the UE, wherein communicating the first service message, the second service message, or both, is based at least in part on the third system information block container.

30. The apparatus of claim 25, wherein the instructions are further executable by the processor to cause the apparatus to:

receive, from the distributed unit, third signaling indicating first scheduling information associated with the first system information block container and second scheduling information associated with the second system information block container; and monitor for the first system information block container and the second system information block container in accordance with the first scheduling information and the second scheduling information, respectively, wherein receiving the first system information block container and the second system information block container is based at least in part on the monitoring.

* * * * *